United States Patent
Yagi et al.

(10) Patent No.: US 7,442,939 B2
(45) Date of Patent: Oct. 28, 2008

(54) RADIATION IMAGE PICKUP APPARATUS AND CONTROLLING METHOD THEREOF AND RADIATION IMAGE PICKUP SYSTEM

(75) Inventors: Tomoyuki Yagi, Honjo (JP); Tadao Endo, Honjo (JP); Toshio Kameshima, Kumagaya (JP); Katsuro Takenaka, Kodama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 11/467,438

(22) Filed: Aug. 25, 2006

(65) Prior Publication Data

US 2007/0096032 A1    May 3, 2007

(30) Foreign Application Priority Data

Sep. 1, 2005  (JP) ............................. 2005-253559

(51) Int. Cl.
*G01T 1/20* (2006.01)
(52) U.S. Cl. ............................................. 250/370.11
(58) Field of Classification Search ............ 250/370.01, 250/370.02, 370.03, 370.04, 370.05, 370.06, 250/370.07, 370.08, 370.09, 370.1, 370.11, 250/370.12, 370.13, 370.14, 370.15, 208.1–208.6, 250/492.1, 492.21, 492.22, 492.23, 492.24, 250/492.3, 252.1
See application file for complete search history.

(56) References Cited

U.S. PATENT DOCUMENTS

| | | | | |
|---|---|---|---|---|
| 6,891,163 B2 * | 5/2005 | Kaneko et al. | ......... | 250/370.09 |
| 6,952,015 B2 | 10/2005 | Kameshima | ........... | 250/370.11 |
| 6,952,464 B2 | 10/2005 | Endo | ....................... | 378/98.11 |
| 6,985,555 B2 | 1/2006 | Endo | ....................... | 378/98.11 |
| 7,002,157 B2 | 2/2006 | Kameshima | ........... | 250/370.11 |
| 7,012,260 B2 | 3/2006 | Endo | ..................... | 250/370.11 |
| 7,138,639 B2 | 11/2006 | Kameshima | ........... | 250/370.11 |
| 7,154,099 B2 | 12/2006 | Endo | ..................... | 250/370.11 |
| 7,227,926 B2 | 6/2007 | Kameshima et al. | ....... | 378/98.9 |
| 2005/0109927 A1 | 5/2005 | Takenaka et al. | ......... | 250/252.1 |
| 2005/0199834 A1 | 9/2005 | Takenaka et al. | ............ | 250/580 |
| 2005/0200720 A1 | 9/2005 | Kameshima et al. | ..... | 348/220.1 |
| 2005/0220269 A1 | 10/2005 | Endo et al. | .................. | 378/114 |
| 2005/0264665 A1 | 12/2005 | Endo et al. | .................. | 348/308 |
| 2006/0119719 A1 | 6/2006 | Kameshima | ................ | 348/308 |
| 2006/0192130 A1 | 8/2006 | Yagi | ..................... | 250/370.14 |

(Continued)

FOREIGN PATENT DOCUMENTS

JP              7-322141              12/1995

*Primary Examiner*—Constantine Hannaher
*Assistant Examiner*—Kiho Kim
(74) *Attorney, Agent, or Firm*—Fitzpatrick, Cella, Harper & Scinto

(57) ABSTRACT

The radiation image pickup apparatus is provided with a sensor array in which a plurality of pixels are two-dimensionally arranged, in which the pixels are provided with a conversion element for converting radiation into electric charge and a switch element for transferring an electrical signal according to the electric charge to the outside, a reading circuit for reading the electrical signal transferred from the switch element through a signal wiring, a driving circuit for supplying a drive signal to the switch element through a drive wiring in order to transfer the electrical signal to the reading circuit and a control unit for changing the voltage value of the drive signal in accordance with the number of drive wirings through which the drive signal is simultaneously supplied from the driving circuit.

8 Claims, 15 Drawing Sheets

U.S. PATENT DOCUMENTS

| | | | |
|---|---|---|---|
| 2006/0289774 A1 | 12/2006 | Endo et al. | 250/370.09 |
| 2007/0040099 A1 | 2/2007 | Yokoyama et al. | 250/208.1 |
| 2007/0069144 A1 | 3/2007 | Kameshima | 250/370.09 |
| 2007/0080299 A1 | 4/2007 | Endo et al. | 250/370.09 |
| 2007/0125952 A1 | 6/2007 | Endo et al. | 250/369 |

* cited by examiner

PHOTOELECTRIC CONVERSION MODE

SATURATION MODE

REFRESH MODE

FIG. 9A REFRESH DRIVING

FIG. 9B STILL IMAGE READING DRIVING

RADIATION IMAGE PICKUP APPARATUS AND CONTROLLING METHOD THEREOF AND RADIATION IMAGE PICKUP SYSTEM

BACKGROUND OF THE INVENTION

1. Field of the Invention

The present invention relates to a radiation image pickup apparatus having a two-dimensional sensor which is provided with a conversion element for converting radiation into electric charge and a transferring unit for transferring an electric signal according to the electric charge to the outside and a plurality of pixel are two-dimensionally arranged and its control method and a radiation image pickup system.

2. Description of the Related Art

Because of advancement of semiconductor technology, radiation image pickup apparatuses respectively using a thin-film semiconductor element are practically used and generalized in recent years.

In the case of these radiation image pickup apparatuses, it is possible to perform not only still image radiographing but also moving image radiographing such as fluoroscopy or CT radiographing which can be conventionally performed by only an image intensifier (I·I), CCD or image pickup apparatus using a special solid-state image sensing device by increasing the speed of the reading operation or raising the sensitivity.

When moving image radiographing can be made by the above-described radiation image pickup apparatus, still image and moving image can be radiographed by one apparatus. Therefore, also when performing still image radiographing while radiographing a moving image, it is possible to efficiently perform the still image radiographing. Moreover, it is possible to perform various radiographings such as fluoroscopy and tomography by one apparatus and a medical care site becomes efficient. Therefore, a radiation image pickup apparatus capable of efficiently radiographing still image and moving image at high quality is requested.

However, to realize a radiation image pickup apparatus purposed from still image radiographing up to moving image radiographing such as fluoroscopy and CT radiographing, antinomic characteristic between resolution requested for still image radiographing and sensitivity requested for moving image radiographing must be realized.

In the case of a radiation image pickup apparatus, the resolution depends on the composition and thickness of phosphor and layer configuration between phosphor and photoelectric conversion element and pixel pitch. Particularly, the pixel pitch must be approx. 100 to 200 μm to realize a resolution requested for still image radiographing.

In the case of moving image radiographing, it is desired that a signal/noise ratio (hereafter referred to as S/N) and a frame rate are high. As the reason, in the case of moving image radiographing, X rays must be applied to a patient for a long time. Therefore, the application dosage of radiation for unit time is restricted to approx. ⅒ to ¹⁄₁₀₀ of still image radiographing. Therefore, to realize S/N necessary for diagnosis in moving image radiographing, it is requested that the sensitivity of a conversion device is high. However, for resolution, it is not necessary that the sensitivity is fine as still image radiographing. Particularly in the case of CT radiographing, an image is operated by a computer and converted into a tomographic image of a human body. Therefore, the resolution every 100 to 200 μm is not necessary. Moreover, in the case of fluoroscopy, necessary resolution depends on a unit to be radiographed or radiographing purpose and resolution is not greatly requested for preview radiographing for still image radiographing.

In general, to improve the S/N of a conversion device, it is a simple method to increase a pixel in size (increase pixel pitch) and increase the sensitivity which is a signal value per pixel. However, increase of a pixel in size results in deterioration of resolution and the resolution requested for still image radiographing cannot be satisfied.

Therefore, in the case of a radiation image pickup apparatus having pixels of a pixel pitch optimized for still image radiographing, when performing moving image radiographing, a plurality of pixels are simultaneously read to perform pixel addition for adding pixel outputs. Thereby, it is possible to apparently handle the pixels as a large pixel. By using this method, it is possible to solve the problem of the resolution requested for still image radiographing and S/N requested for moving image radiographing which are an antinomic problem. In this case, the S/N improved by pixel addition is approx. √n times (n is the added number of pixels) larger than the S/N when pixel addition is not performed.

This pixel addition is disclosed in, for example, Japanese Patent Application Laid-Open No. H07-322141.

SUMMARY OF THE INVENTION

However, when performing pixel addition for adding and reading pixel outputs in order to obtain a sensitivity necessary for moving image radiographing, an electric offset component is increased and output voltage of an amplifier for reading pixel outputs is decreased and a problem occurs that the dynamic range of a radiation image pickup apparatus is decreased and a sensitivity characteristic of the apparatus is deteriorated.

The present invention is made in view of the above problem and its object is to avoid decrease of the dynamic range of a radiation image pickup apparatus or deterioration of the sensitivity characteristic of the apparatus when performing the pixel addition for adding and reading pixel outputs in order to obtain the sensitivity necessary for moving image radiographing.

A radiation image pickup apparatus of the present invention is provided with a sensor array in which a plurality of pixels are two-dimensionally arranged, wherein the pixel includes conversion element for converting radiation into electric charge and a switch element for transferring an electrical signal according to the electric charge to the outside, and includes a reading circuit for reading the electrical signal transferred from the switch element through a signal wiring, driving circuit for supplying a drive signal to the switch element through a drive wiring for transferring the electrical signal to the reading circuit and a control unit for changing the voltage value of the drive signal in accordance with the number of pixels in which the electrical signal is read by the reading circuit at the same time.

A radiation image pickup system of the present invention includes the radiation image pickup apparatus and the radiation generating apparatus for emitting radiation. In this case, the conversion element electrically converts the radiation emitted from the radiation generating apparatus and passing through an object into an electrical signal.

A control method of a radiation image pickup apparatus of the present invention is a control method of a radiation image pickup apparatus having a sensor array in which a plurality of pixels are two-dimensionally arranged and which is provided with a conversion element for converting radiation into electric charge and a switch element for transferring electrical signals according to the electric charge to the outside, a reading circuit for reading the electrical signals and a driving circuit for supplying a drive signal to the switch element to drive the switch element and changes the voltage value of the drive signal in accordance with the number of pixels in which the electrical signals are simultaneously read by the reading circuit.

Further features of the present invention will become apparent from the following description of exemplary embodiments with reference to the attached drawings.

DESCRIPTION OF THE EMBODIMENTS

Figure 1:
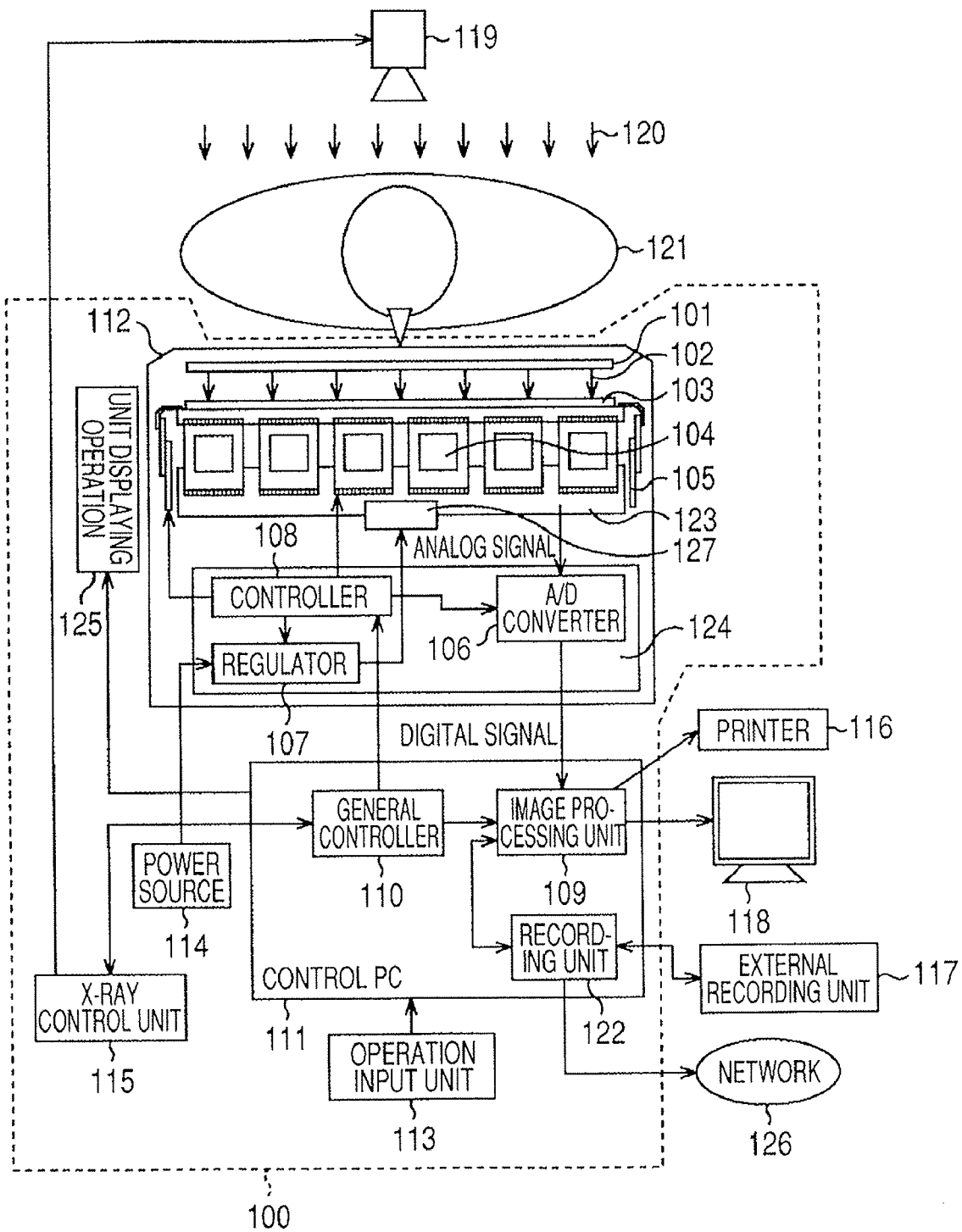
FIG. 1 is a schematic block diagram of an X-ray image pickup system of first embodiment of the present invention.

Hereafter, the present invention is described by referring to the accompanying drawings. In the case of the present invention, an example using X rays as radiation is shown. Radiation of the present invention is not restricted to X rays but it also includes electromagnetic waves such as α ray, β ray and γ ray.

First, problems to be solved by the present invention found by the present inventor are described below in detail by referring to the drawings.

Figure 13:
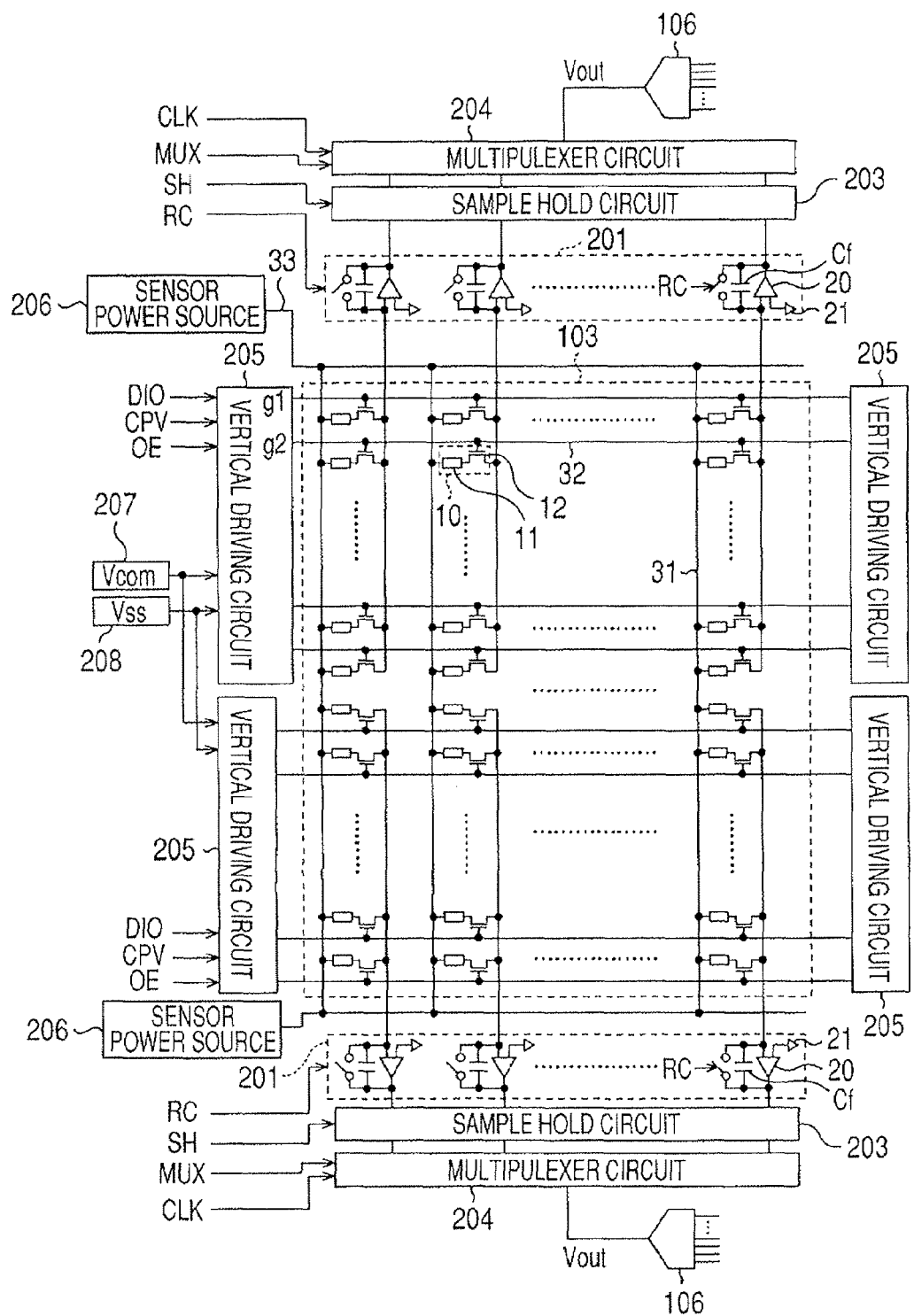
FIG. 13 a circuit diagram of an FPD (flat panel detector) constituting a general X-ray image pickup apparatus.

FIG. 13 is a circuit diagram of a plane detector (hereafter referred to as FPD) constituting a conventional radiation image pickup apparatus.

This FPD has a two-dimensional area sensor (sensor array) 103 in which pixels 10 respectively provided with one conversion element 11 and one TFT 12 serving as a switch element are two-dimensionally arranged. Moreover, the FPD has a vertical driving circuit 205 for controlling on/off of the TFT 12 and a signal amplifying circuit 201 for amplifying an electrical signal output from the TFT 12. Furthermore, the FPD has a sample hold circuit 203 for holding a signal from the signal amplifying circuit 201 for a period until the signal is transferred to an A/D converter 106. Furthermore, the FPD has a multiplexer circuit 204 for reading electrical signals held by the sample hold circuit 203 in time series and an A/D converter 106 for converting an analog signal output from the multiplexer circuit 204 into a digital signal. Furthermore, the FPD is constituted by including a sensor power supply 206 for supplying a voltage necessary for photoelectric conversion to a conversion element 11, TFT-on power supply 207 for supplying a voltage Vcom for turning on the TFT 12 and a TFT-off power supply 208 for supplying a voltage Vss for turning off the TFT 12.

In FIG. 13, one pixel shares a signal wiring 31 with a vertical directional (column directional) pixel and shares a drive wiring 32 with a horizontal directional (row directional) pixel. Moreover, a sensor bias wiring 33 is commonized to all pixels.

The vertical driving circuit 205 is constituted of a shift register and controlled by a control signal DIO of a shift clock for supplying an output pulse to the shift register, control signal CPV of a driving clock of the shift register and control signal OE for changing outputs. Moreover, to read electrical signals accumulated in the pixels 10 from the image pickup apparatus constituted as shown in FIG. 13, it is possible to drive the image pickup apparatus at the driving timing shown in FIGS. 14A and 14B.

Figure 14A:
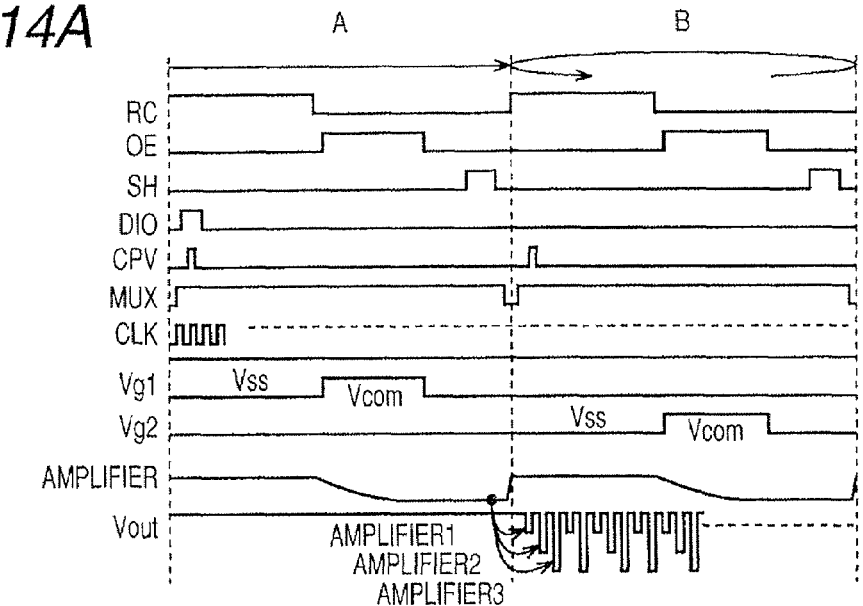
FIGS. 14A and 14B are timing charts showing driving of a general X-ray image pickup apparatus.
Figure 14B:
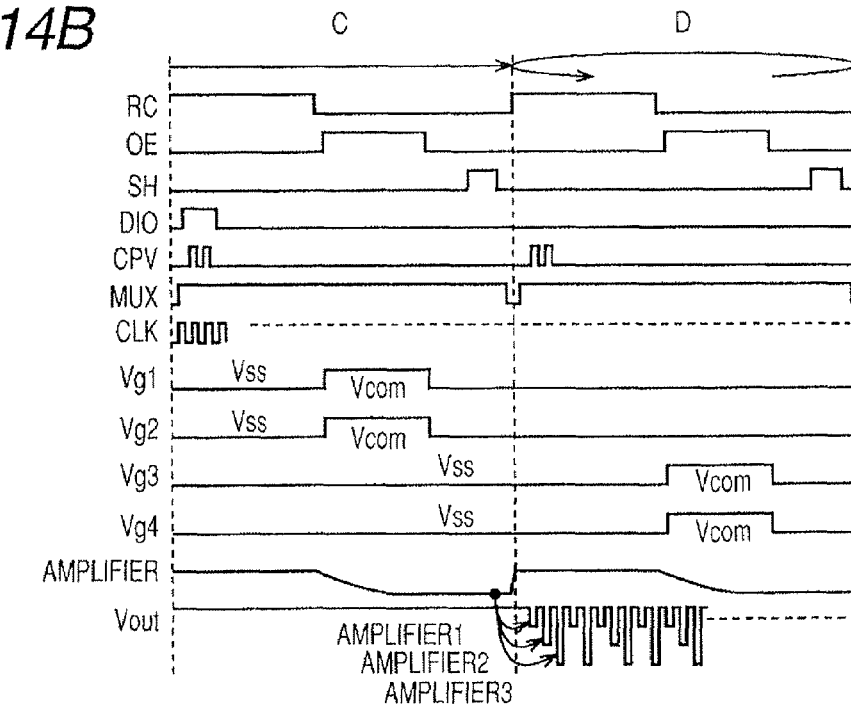

FIGS. 14A and 14B are timing charts showing driving of a conventional radiation image pickup apparatus. FIG. 14A shows a timing chart in the still image radiographing mode for reading pixel outputs of a two-dimensional area sensor by reading one pixel for one signal wiring 31. Moreover, FIG. 14B shows a timing chart in the moving image radiographing mode for reading pixel outputs of a two-dimensional area sensor by adding and reading two pixels for one signal wiring 31.

When reading electrical signals taking charge of the information on a human body according to electric charges accumulated in a photoelectric conversion element 11, the potential of the signal amplifying circuit 201 or the potential of the signal wiring 31 connected to the signal amplifying circuit 201 is initialized. Therefore, RC is set to Hi. Thereby, a capacitor Cf following an amplifier 20 in the signal amplifying circuit 201 is reset and an output of the signal amplifying circuit 201 or potential of the signal wiring 31 is reset. By this resetting operation, an electrical signal not related to the information on a human body such as an offset component or noise generated at the time of the last reading is removed and image quality is improved.

A desired pulse is provided as a control signal CPV or DIO during the resetting operation of the amplifier 20 to operate he shift register of the vertical driving circuit 205. A pulse necessary as the control signal CPV or DIO is provided, the resetting operation is sufficiently performed and then the control signal OE is set to Hi to turn on the TFT 12. For example, in FIG. 14A, while the control signal DIO is set to Hi, the control signal CPV is 1 clock-input. Therefore, all TFTs 12 of horizontal one line are turned on. In this case, an electrical signal for one pixel for one signal wiring 31 is accumulated in the capacitor Cr following the amplifier 20 of the signal amplifying circuit 201.

Then, after the TFT 12 is turned on until electrical signals in the switch element 11 are sufficiently transferred, the TFT 12 is turned off, the control signal SH is set to Hi and outputs of the amplifier 20 are held in the sample hold circuit 203. Electrical signals held in the sample hold circuit 203 are sent to the A/D converter 106 by the multiplexer circuit 204 in time series while reading the next line. Then, to read all pixels from the two-dimensional sensor 103, the operation of the interval B shown in FIG. 14A is repeatedly performed.

However, when adding and reading pixels, the TFTs 12 for a plurality of lines are simultaneously turned on. To simultaneously turn of TFTs 12 for a plurality of lines, the clocks of the control signal CPV are input by the added number of pixels (two pixels in the case of the example shown in FIG. 14B) are input when the control signal DIO is set to Hi at the driving timing of the interval C as shown in FIG. 14B and at the driving timing of the interval D, clocks of the control signal CPV are input for the added number of pixels (for two pixels in the case of the example shown in FIG. 14B). In the case of the example shown in FIG. 14B, by the driving timing, TFTs 12 in the adjacent vertical two lines are simultaneously turned on and electrical signals (electric charges) for two pixels per signal wiring 31 are transferred to each amplifier 20. In the case of each amplifier 20, electric charges for two pixels are integrated, converted into voltage, and output.

As described above, read driving by pixel addition can be performed by one change of control signals. However, when performing pixel addition by a digital X-ray image pickup apparatus, the voltage fluctuation of the drive wiring 32 when the TFT 12 is turned on/off is increased by the capacity between the drive wiring 32 and the signal wiring 31. Therefore, the following problem occurs.

Figure 15A:
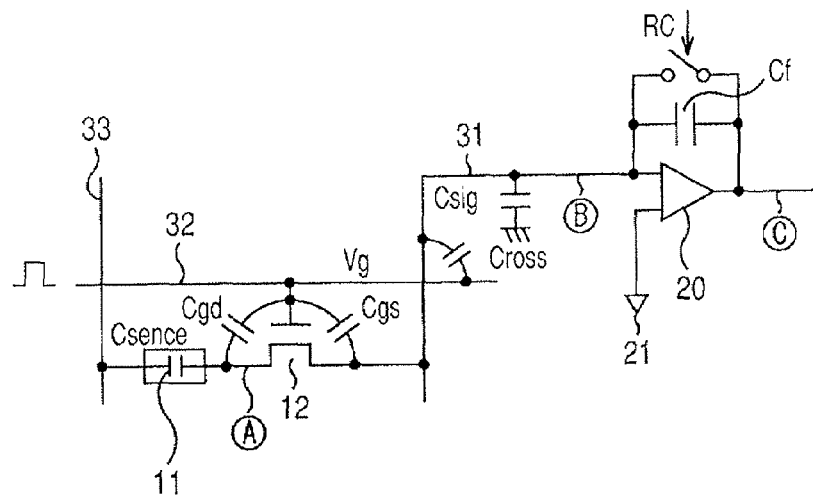
FIGS. 15A and 15B are illustrations for explaining the voltage fluctuation in a two-dimensional area sensor when a TFT is turned on/off.
Figure 15B:
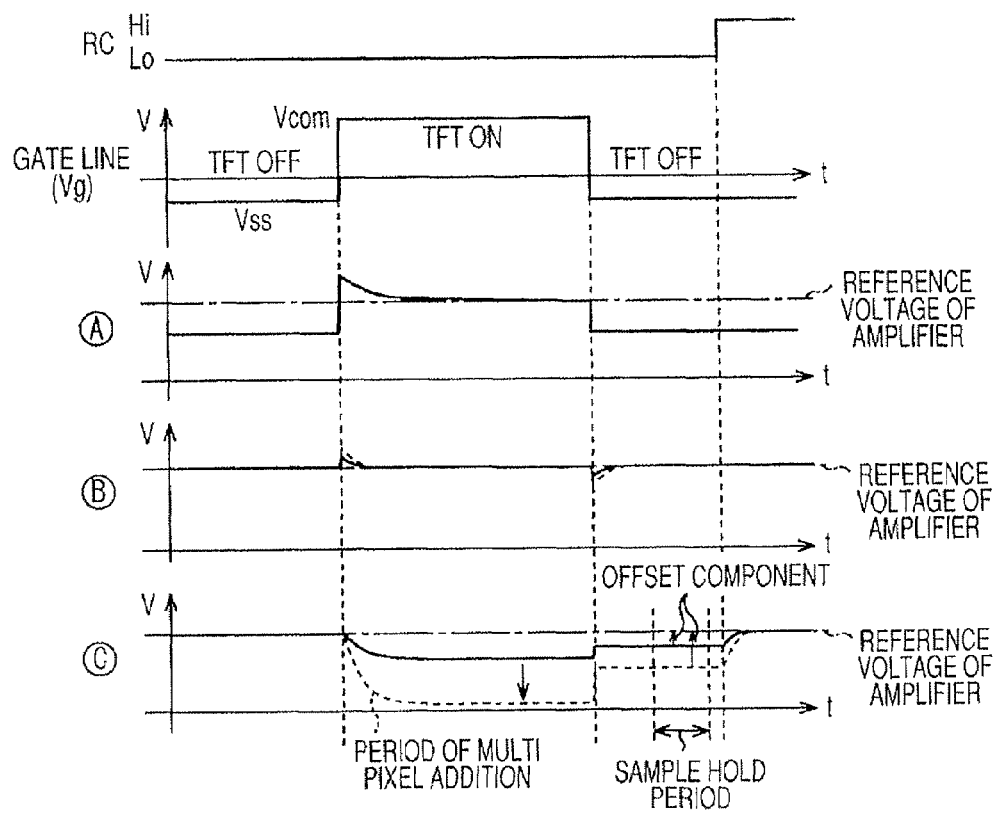

FIGS. 15A and 15B are illustrations for explaining voltage fluctuation in a two-dimensional sensor when the TFT 12 is turned on/off. FIG. 15A shows a circuit diagram for one pixel in a two-dimensional sensor and FIG. 15B shows a timing chart at each spot of the two-dimensional sensor shown in FIG. 15A.

As shown in FIG. 15A, three capacities are present when roughly dividing the capacity formed between the signal wiring 31 and the drive wiring 32. One of them is a capacity Cgs formed between the source and the gate of the TFT 12, the second one of them is a capacity Cgd formed between the drain and the gate of the TFT 12 and the third one of them is a capacity Ccross formed at a unit at which the signal wiring 31 intersects with the drive wiring 32.

When the TFT 12 is turned on/off, a voltage supplied to the drive wiring 32 changes. In this case, the voltage fluctuation of the signal wiring 31 is caused by the influence of the above three capacities. Voltage waveforms shown in FIG. 15B show voltage fluctuations at the drive wiring 32 and spots A, B and C shown in FIG. 15A.

As shown in FIG. 15B, when a voltage Vcom for turning on the TFT 12 is applied to the drive wiring 32, the voltage at the spot A is shaken in the positive direction. Then, the shaken value $V_A$ can be shown by the following formula 1.

$$V_A = \frac{Cgd}{Csense + Cgd} \times (Vcom - Vss) \qquad \text{(Expression 1)}$$

At the spot A, when the TFT 12 is turned on, the voltage fluctuation for voltage $V_A$ once occurs. However, because the TFT 12 is turned on and the spot A and amplifier 20 are connected through the TFT 12, the voltage $V_A$ is changed to the reference voltage of the reference power supply 21 of the amplifier 20 (voltage shown by an alternate long and short dash line in FIG. 15B).

Similarly, also at the spot B on the signal wiring 31, a voltage is raised by $V_B$ shown by the following Expression 2 and then becomes the reference voltage of the reference power supply 21 of the amplifier 20.

$$V_B = \frac{Cgs}{Csig + Cgs} \times (Vcom - Vss) \qquad \text{(Expression 2)}$$

In this case, the amplifier 20 integrates, amplifies and outputs a current generated due to voltage fluctuation at the spots A and B and a voltage becomes a voltage lower than the reference voltage of the reference power supply 21 of the amplifier 20 at the spot C. Therefore, the output voltage of the amplifier 20 simultaneously becomes lower as the number of signal wirings 31 which become a voltage Vcom increases, that is, as the added number of pixels increases. Therefore, the output range of the amplifier 20 becomes small by the voltage fluctuated when the TFT 12 is turned on.

For example, when electrical signals (electric charges) due to X rays passing through a human body are accumulated in the conversion element 11, the output of the amplifier 20 outputs a voltage proportional to electric charges accumulated in the conversion element 11 from the state shown at the point C in FIG. 15B. Therefore, when the voltage fluctuation when the TFT 12 is turned on is large, a problem occurs that the amplifier 20 cannot output a voltage proportional to the electric charges accumulated in the conversion element 11.

Then, when turning off the TFT 12, the voltage Vcom is shaken to the minus direction because the drive wiring 32 fluctuates from the voltage Vcom to voltage Vss at the spot A. In this case, the TFT 12 is turned off and the spot A is not conductive with the amplifier 20. Therefore, the spot A keeps the shaken state. At the spot B, a voltage is shaken to the minus direction similarly to the case of the spot A but the voltage immediately returns to the reference voltage of the reference power supply 21 of the amplifier 20. At the spot C, a voltage is shaken to the plus direction by receiving the voltage fluctuation at the spots A and B but the voltage does not return to the original voltage, that is, it does not return to the reference voltage of the amplifier 20 completely. This is because the voltage fluctuation at the spot A is not conducted to the signal wiring 31 because the TFT 12 is turned off.

When sample-holding an output of the amplifier 20 by the sample hold circuit 203 in this state, an output of the amplifier 20 which is not completely returned is output as an offset. The offset component increases when the added number of pixels increases. When the offset component which does not make sense as an image signal increases, the dynamic range of an image pickup apparatus is decreased.

The present inventor finds that an electric offset component is increased and the output voltage of an amplifier for reading a pixel output is lowered by performing the pixel addition described above and problems such as decrease of the dynamic range of a radiation image pickup apparatus and deterioration of sensitivity characteristic occur.

To solve the above problems, it is necessary to decrease the capacity formed between a signal line and a gate line. For example, it is difficult to decrease the capacities Cgd and Cgs shown FIG. 15A because it is necessary to greatly change a TFT fabrication process.

Therefore, in the case of the present invention, a voltage to be supplied from a driving circuit to a switch element (TFT) is changed in accordance with the number of pixels from which electrical signals are simultaneously read. Thereby, for example, when adding and reading pixels, a voltage for turning on a TFT is lowered compared to the case of reading pixels one by one. Thereby, it is possible to restrain the voltage fluctuation of a signal wiring. By using this method, it is only necessary to set a voltage in view of the transfer capacity of a TFT, and therefore, control is also easy.

In general, the transfer capacity of a TFT is better as a voltage for turning on the TFT rises. However, it is not always necessary to completely transfer electric charges in a conversion element in the case of moving image radiographing for performing pixel addition. Moreover, because the TFT is used in a current area, the transfer capacity of the TFT is not greatly lowered even if ON-voltage is lowered. Furthermore, in the case of pixel addition, S/N is approx. vn times (n is the added number of pixels). Therefore, even if the transfer capacity of the TFT is lowered by lowering the ON-voltage of the TFT, S/N is not greatly changed.

Therefore, in the case of the moving image radiographing for performing pixel addition, it is possible to solve the above problem by lowering the ON-voltage (voltage Vcom) of the TFT. Moreover, the best images can be obtained from still image radiographing and moving image radiographing by changing at least two voltages such as ON-voltage of a TFT for satisfying the transfer capacity necessary for a still image and ON-voltage of a TFT set so that the above trouble does not occur at the time of pixel addition of moving image radiographing.

Preferred embodiments of the present invention for solving the above problems are described below by referring the accompanying drawings.

First Embodiment

FIG. 1 is a schematic block diagram of the X-ray image pickup system of the first embodiment of the present invention.

The X-ray image pickup system of this embodiment has an X-ray generating apparatus 119 for emitting X ray 120 on an object 121 and an X-ray image pickup apparatus 100 for radiographing the X ray 120 passing through the object 121. Moreover, the system has a printer 116 for printing out the image data processed by the X-ray image pickup apparatus 100, external recording apparatus 117 for recording the image data and monitor 118 for displaying the image data. Furthermore, the system is constituted by including a network 126 for transmitting the image data to an external system.

The X-ray image pickup apparatus 100 has a flat panel detector (FPD) 112 for reading the X ray 120 passing through an object 121 as an electrical signal and a control PC 111 for presidentially controlling the X-ray image pickup apparatus 100. Moreover, the apparatus 100 has an operation input unit 113 for operation-inputting various settings for ID registration of an object 121 and an imaged site, various settings for the radiographing mode of the X-ray image pickup apparatus 100 (including the setting of the number of pixels for simultaneously reading electrical signals from a reading circuit 104 to be described later), various settings for the X-ray generating apparatus 119 and setting of image processing method of radiographed image. Furthermore, the apparatus 100 is constituted by including a power supply 114 for supplying a voltage to the FPD 112, X-ray control unit 115 for controlling the X-ray generating apparatus 119 in accordance with the setting of the X-ray generating apparatus 119 by the operation input unit 113 and operation display unit 125 for displaying an operation state of the X-ray image pickup apparatus 100.

The FPD 112 has a wavelength converting body 101 such as a phosphor for converting the X ray 120 passing through the object 121 into visible light 102. Moreover, the FPD 112 has an area sensor (sensor array) 103 which is provided with a photoelectric conversion element for receiving the visible light 102 and converting it into electric charge and TFT serving as a switch element for transferring an electrical signal corresponding to the electric charge to the outside and in which a plurality of pixels are two-dimensionally arranged. Furthermore, the FPD 112 has a reading circuit 104 for amplifying and reading an electrical signal transferred from the TFT of the area sensor 103 and a driving circuit 105 for supplying a drive signal to a TFT for transferring an electrical signal when reading the electrical signal by the reading circuit 104 and driving the TFT. Furthermore, the FPD 112 has an A/D converter for converting analog electrical signal read by the reading circuit 104 into a digital signal. Furthermore, the FPD 112 is constituted by including the area sensor 103, a regulator 107 for generating a voltage necessary for the reading circuit 104 and, vertical driving circuit 105 and supplying the generated voltage through a low-noise power supply 127 and a control unit 108 for transmitting a control signal for driving the two-dimensional sensor 103 to the reading circuit 104 and vertical driving circuit 105. A wavelength converting body and a photoelectric conversion element constitute a conversion element for converting radiation into electric charge.

Moreover, the FPD 112 is provided with a relay board 123 and control board 124. The relay board 123 transmits an electrical signal amplified by a not-illustrated signal amplifying circuit constituted in the reading circuit 104 to the A/D converter 106 of the control board 124. The above-described A/D converter 106, regulator 107 and control unit 108 are arranged on the control board 124.

The control unit 108 controls the regulator 107 so as to change the voltage value of a drive signal to be supplied from the vertical driving circuit 105 to the TFT of the area sensor 103 in accordance with the number of pixels for simultaneously reading electrical signals by the reading circuit 104. In this case, the number of pixels for simultaneously reading electrical signals from the reading circuit 104 is decided by various settings for the radiographing mode set by the operation input unit 113.

The control PC 111 has an image processing unit 109 for applying predetermined image processing to a digital signal output from the A/D converter 106 and a recording unit 122 for recording a digital signal processed by the image processing unit 109 as image data. Moreover, the control PC 111 is constituted by including a presidential control unit 110 for presidentially controlling the processing of the whole X-ray image pickup apparatus such as storage of the image data, output of the image data, driving of the X-ray generating apparatus 119 and driving of the FPD 112.

A photoelectric conversion element and TFT constituting pixels of the area sensor 103 are formed of a thin-film semiconductor process using non-crystal such as amorphous silicon. In this case, the thin-film semiconductor process is used because it is possible to uniformly form active elements such as a photoelectric conversion element and TFT in a large area.

Figure 2:
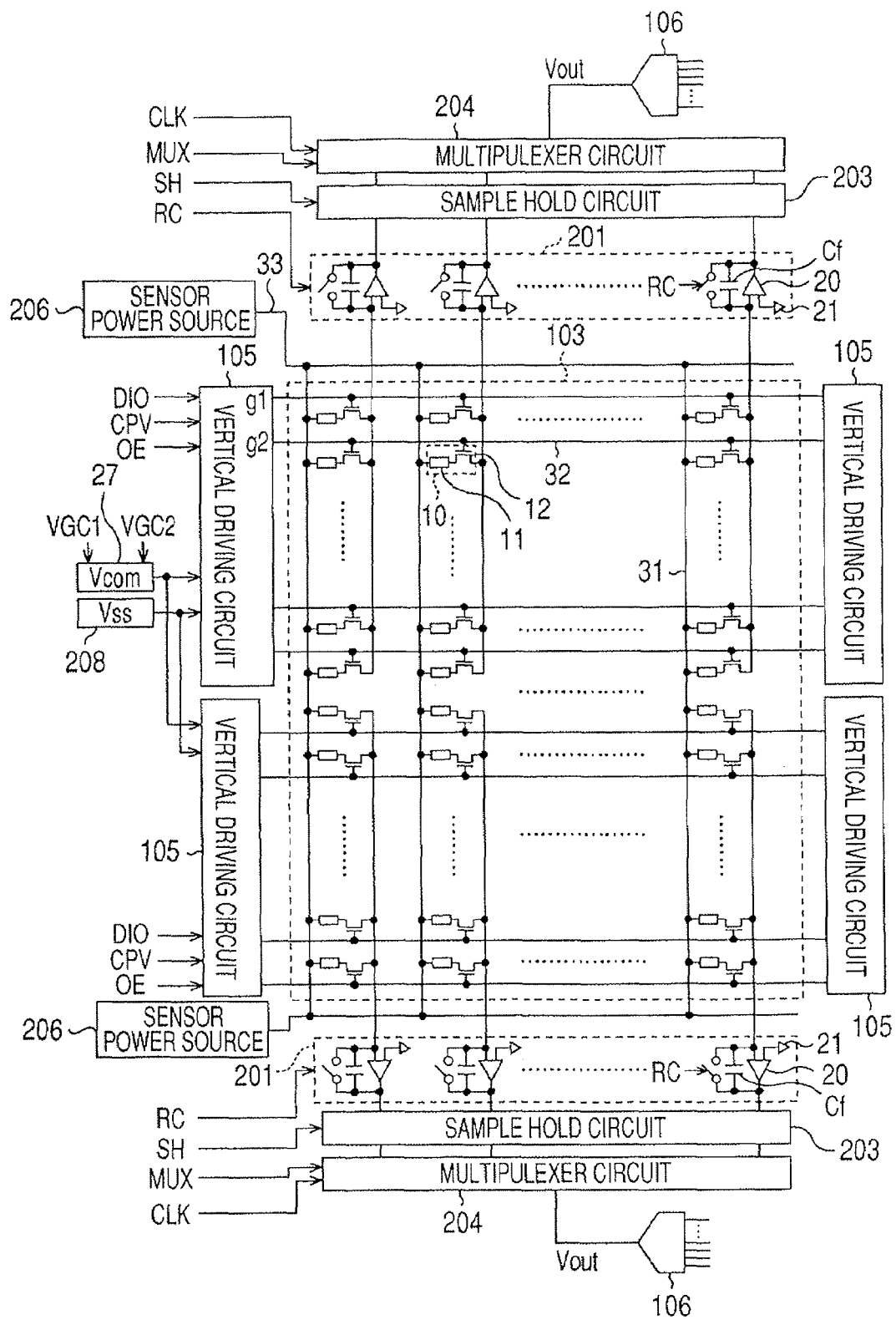
FIG. 2 is a circuit diagram of the FPD shown in FIG. 1.

FIG. 2 is a circuit diagram of the FPD shown in FIG. 1. In this case, a component same as that of the conventional FPD shown in FIG. 13 is provided with the same symbol and its description is omitted.

A difference from the conventional FPD shown in FIG. 13 is that the FPD is constituted by including a TFT-on power supply 27 for supplying a voltage Vcom for turning on the TFT 12.

The TFT-on power supply 27 supplies a voltage corresponding to the number pixels for simultaneously reading electrical signals from the reading circuit 104 to the TFT of the area sensor 103 through the vertical driving circuit 105 by control signals VGC1 and VGC2 from the control unit 108.

The vertical driving circuit 105 is constituted of a shift register and controlled by the control signal DIO of a shift clock for supplying output pulse to the shift register, control signal CPV of a driving clock of the shift register and control signal OE for output change.

In this case, the signal amplifying circuit 201, sample hold circuit 203 and multiplexer circuit 204 in FIG. 2 correspond to the reading circuit 104 in FIG. 1. Moreover, the sensor power supply 206, TFT-on power supply 27 and TFT-off power supply 208 in FIG. 2 are constituted of the regulator 107 and low-noise power supply 127 in FIG. 1. Furthermore, the control signal RC for the signal amplifying circuit 201, control signal SH for the sample hold circuit 203, control signals MUX and CLK for the multiplexer circuit 204, control signals DIO, CPV and OE for the vertical driving circuit 105 and control signals VGC1 and VGC2 for the TFT-on power supply 27 are output from the control unit 108 in FIG. 1.

Furthermore, one pixel in FIG. 2 shares the signal wiring 31 with a vertical directional (column directional) pixel and moreover shares the drive wiring 32 with a horizontal directional (row directional) pixel. Furthermore, the sensor bias wiring 33 is commonized to all pixels.

Figure 3:
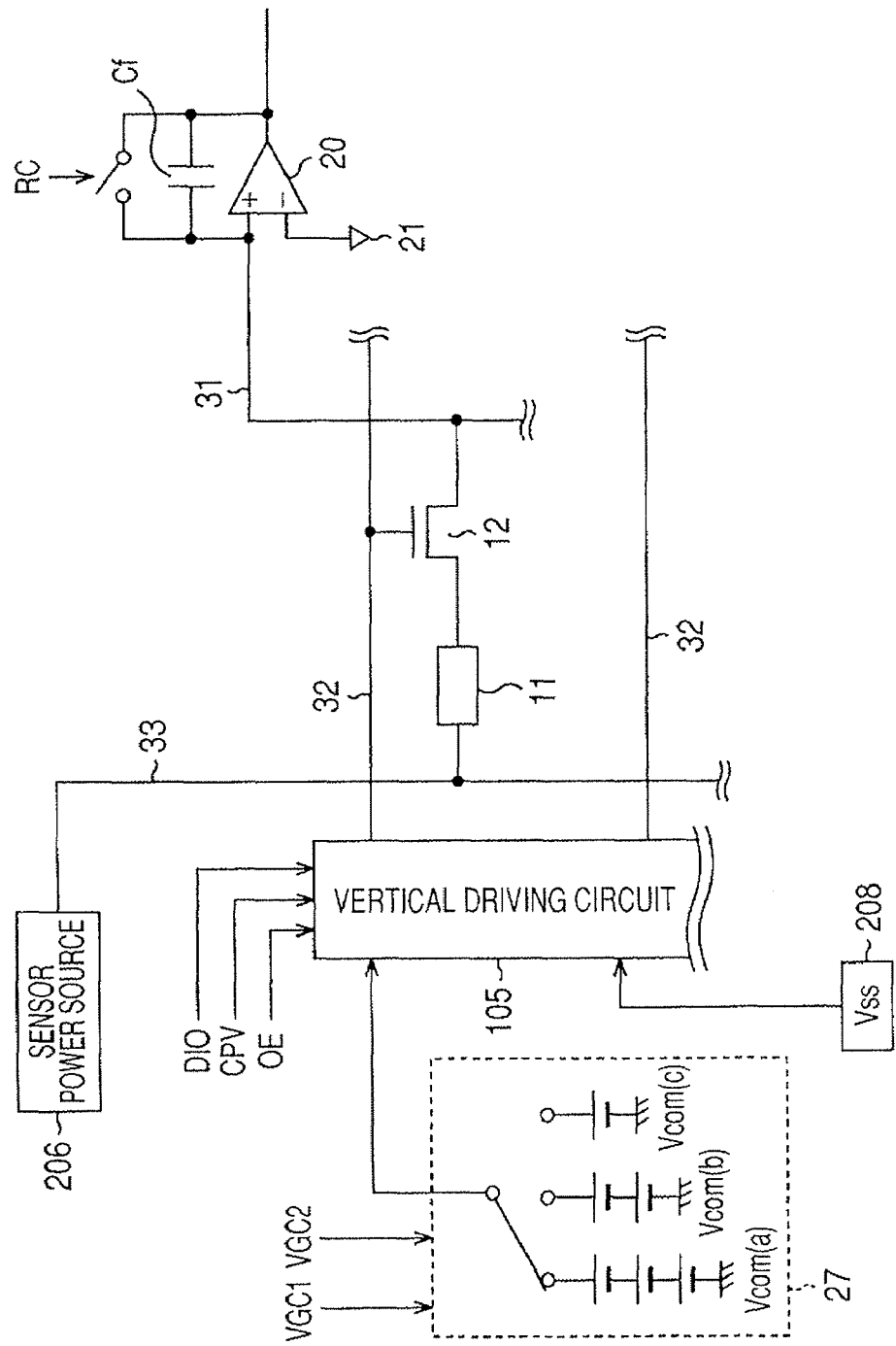
FIG. 3 is a circuit diagram for one pixel in a two-dimensional area sensor of an X-ray image pickup apparatus of first embodiment of the present invention.

FIG. 3 is a circuit diagram for one pixel in an area sensor of the X-ray image pickup apparatus of the first embodiment of the present invention.

The control unit 108 transmits controls signals VGC1 and VGC2 for changing a voltage to be supplied to the vertical driving circuit 105 to the TFT-on power supply 27 in accordance with the number of pixels for simultaneously reading electrical signals from the reading circuit 104 set by the operation input unit 113. In this case, the control signals VGC1 and VGC2 are described later in the description of FIGS. 4A and 4B.

This embodiment is constituted so that three different voltages Vcom(a), Vcom(b) and Vcom(c) can be supplied from the TFT-on power supply 27 in accordance with the control signals VGC1 and VGC2 (from the control unit 108). However, magnitudes of voltages are in the relation of Vcom(a) >Vcom(b)>Vcom(c).

Specifically, in the case of this embodiment, in the case of the still image radiographing mode for reading electrical signals one pixel by one pixel from the reading circuit 104, the voltage Vcom(a) is supplied from the TFT-on power supply 27 to the vertical driving circuit 105. Moreover, in the case of the moving image radiographing mode for simultaneously adding two to four pixels and reading electrical signals from the reading circuit 104, the voltage Vcom(b) is supplied from the TFT-on power supply 27 to the vertical driving circuit 105. Furthermore, in the case of the moving image radiographing mode for simultaneously adding five pixels or more and reading electrical signals from the reading circuit 104, the voltage Vcom(c) is supplied from the TFT-on power supply 27 to the vertical driving circuit 105. That is, the control unit 108 controls so that a voltage to be supplied to the TFT 12 from the vertical driving circuit 105 is lowered as the number of pixels for simultaneously reading electrical signals from the reading circuit 104 increases.

As described above, when the control unit 108 changes the voltage to be supplied to the TFT 12 from the vertical driving circuit 105 in accordance with the number of pixels to be added and read by the reading circuit 104, the voltage fluctuation of the signal wiring 31 generated by turning on/of the TFT 12 is restrained, lowering of the output voltage of an amplifier for reading an pixel output is avoided and increase of the offset component generated at the time of pixel addition is avoided.

Figure 4A:
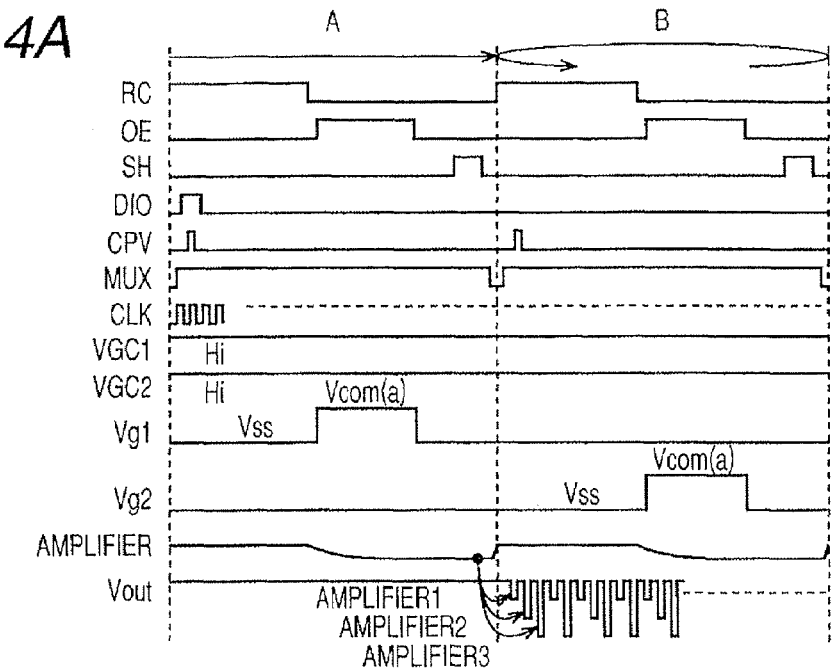
FIGS. 4A and 4B are timing charts showing driving of the X-ray image pickup apparatus of the first embodiment of the present invention.
Figure 4B:
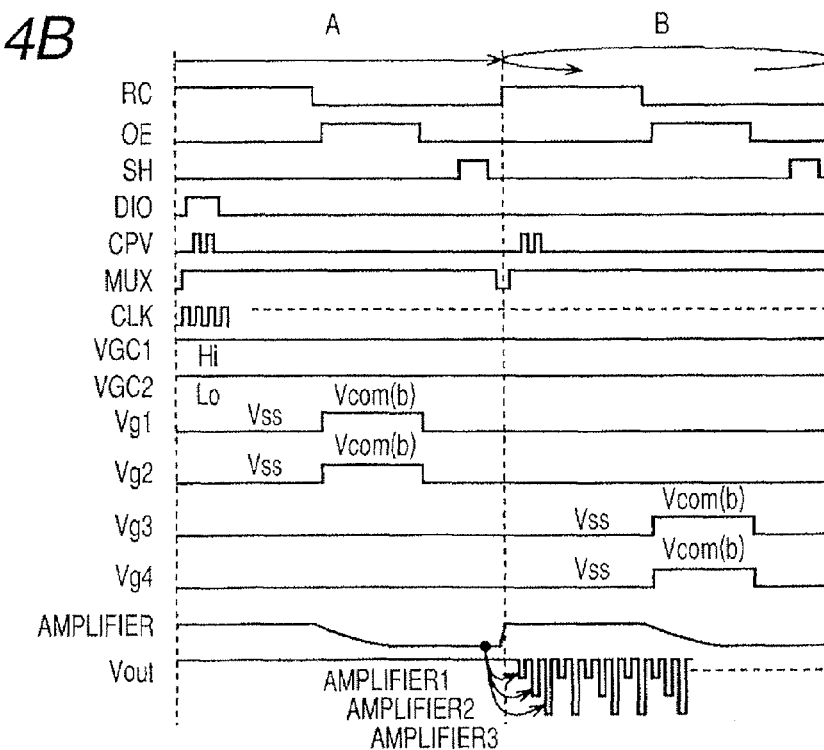

FIGS. 4A and 4B are timing charts showing driving of the X-ray image pickup apparatus of the first embodiment of the present invention. FIG. 4A shows a timing chart in the still image radiographing mode for reading pixel outputs of a two-dimensional area sensor every pixel for one signal wiring 31. FIG. 14B shows a timing chart in the moving image radiographing mode for adding and reading pixel outputs of a two-dimensional area sensor by adding and reading two pixels for one signal wiring 31.

When reading electrical signals taking charge of the information on a human body accumulated in the photoelectric conversion element 11, RC is set to Hi in order to initialize the potential of the signal amplifying circuit 201 or the potential of the signal wiring 31 connected to the signal amplifying circuit 201. Thereby, the capacitor Cf following the amplifier 20 in the signal amplifying circuit 201 is reset and an output of the signal amplifying circuit 201 or the potential of the signal wiring 31 is reset. According to the reset operation, an electrical signal not-related to the information on a human body such as an offset component or noise generated at the time of the last reading is removed and image quality is improved.

A desired pulse is supplied as a control signal CPV or DIO during the reset operation of the amplifier 20 to operate the shift register of the vertical driving circuit 105. After a necessary pulse is supplied as the control signal CPV or DIO and the reset operation is sufficiently performed, the control signal OE is set to Hi to turn on the TFT 12. In this case, in the still image radiographing mode shown in FIGS. 4A and 4B, both control signals VGC1 and VGC2 from the control unit 108 to the TFT-on power supply 27 are set to Hi. Therefore, as a voltage for turning on the TFT 12 from the TFT-on power supply 27 through the vertical driving circuit 105, the voltage Vcom(a) is supplied to each drive wiring 32. The voltage Vcom(a) is set to a value larger than other voltages (Vcom(b) and Vcom(c)) for turning on the TFT 12 so that the TFT 12 sufficiently transfers electric charges of the photoelectric conversion element 11 so that a required image is obtained in a still video. Moreover, in FIG. 4A, the control signal CPV is input by one clock while the control signal DIO is kept at Hi. Therefore, all TFTs 12 for one horizontal line are turned on. In this case, electrical signals for one pixel per signal wiring 31 are accumulated in the capacitor Cf following the amplifier 20 of the signal amplifying circuit 201.

Then, the TFT 12 is turned on until electric charges in the photoelectric conversion element 11 are sufficiently transferred, the TFT 12 is turned off, the control signal SH is set to Hi and an output of the amplifier 20 is held in the sample hold circuit 203. The electrical signals held by the sample hold circuit 203 are sent to the A/D converter 106 in time series by the multiplexer circuit 204 while the next line is read. Then, to read all pixels from the area sensor 103, the operation in the interval B shown in FIG. 4A is repeated.

However, when adding and reading two pixel outputs shown in FIG. 4B, the TFT 12 is driven so as to simultaneously turn on two lines of the TFTs 12. To simultaneously turn on two lines of the TFTs 12, clocks of the control signal CPV for two pixels are input when the control signal DIO is set to Hi at the driving timing of the interval C as shown in FIG. 4B. Moreover, clocks of the control signal CPV for two pixels are input when the control signal DIO is set to Hi at the driving timing of the interval D. According to this driving timing, TFTs 12 for adjacent vertical two lines are simultaneously turned on in the case of the example shown in FIG. 4B. Then, electrical signals (electric charges) for two pixels for one signal wiring 31 are transferred to each amplifier 20. In the case of each amplifier 20, electric charges for two pixels are integrated, converted into voltages and output.

Moreover, in the case of this embodiment, when simultaneously turning on TFTs 12 for two lines, the control signal VGC1 from the control unit 108 to the TFT-on power supply 27 is set to Hi and the control signal VGC2 is set to Lo. Therefore, as a voltage for simultaneously turning on the TFTs 12 for two lines from the TFT-on power supply 27 through the vertical driving circuit 105, the voltage Vcom(b) lower than the voltage Vcom(a) is simultaneously supplied to the drive wiring 32 every two lines.

Furthermore, when adding and reading many pixel outputs (when adding and reading five pixels or more in the case of this embodiment), the number of pixels for adding and reading clocks of the control signal CPV is input when the control signal DIO is kept at Hi to simultaneously turn on the TFTs 12 for the number of pixels. Moreover, the control signals VGC1 and VGC2 for the TFT-on power supply 27 are set to Lo from the control unit 108. Then, as a voltage for simultaneously turning on each TFT 12 from the TFT-on power supply 27 through the vertical driving circuit 105, the voltage Vcom(c) lower than the voltage Vcom(b) is supplied to each drive wiring 32.

In this case, for this embodiment, the supply voltage of the TFT-on power supply 27 for turning on the TFT 12 is described by using three types of voltages Vcom(a) to Vcom (c) as an example. However, the present invention is not restricted to the above case. For example, it is allowed to use an embodiment for preparing the supply voltage of the TFT-on power supply 27 by the added number of pixels in an X-ray image pickup apparatus. Moreover, a voltage value supplied from the TFT-on power supply 27 is set by considering a purpose of an X-ray image pickup apparatus and the added number of pixels suitable for the radiographing purpose.

Furthermore, as the driving timing of the X-ray image pickup apparatus of this embodiment, optimized timing is used by considering characteristics of the TFT 12 and photoelectric conversion element 11, restriction of a circuit to be connected to the two-dimensional sensor 103 or frame rate requested for moving image radiographing.

Second Embodiment

Second embodiment is an embodiment to which an MIS-type photoelectric conversion element is applied as a photoelectric conversion element of the area sensor 103.

Figure 5:
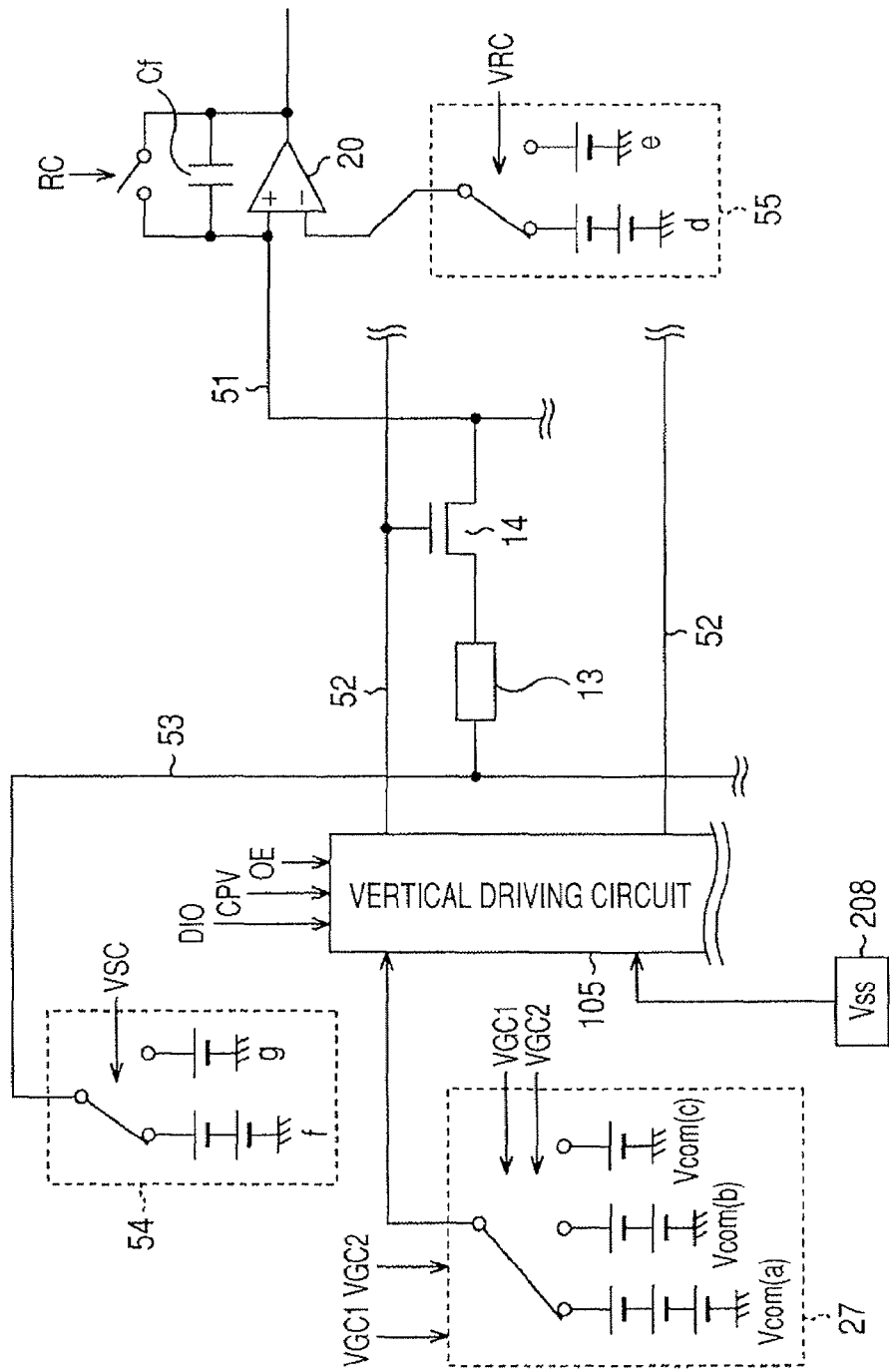
FIG. 5 is a circuit diagram for one pixel of a two-dimensional area sensor of an X-ray image pickup apparatus of second embodiment of the present invention.
Figure 6:
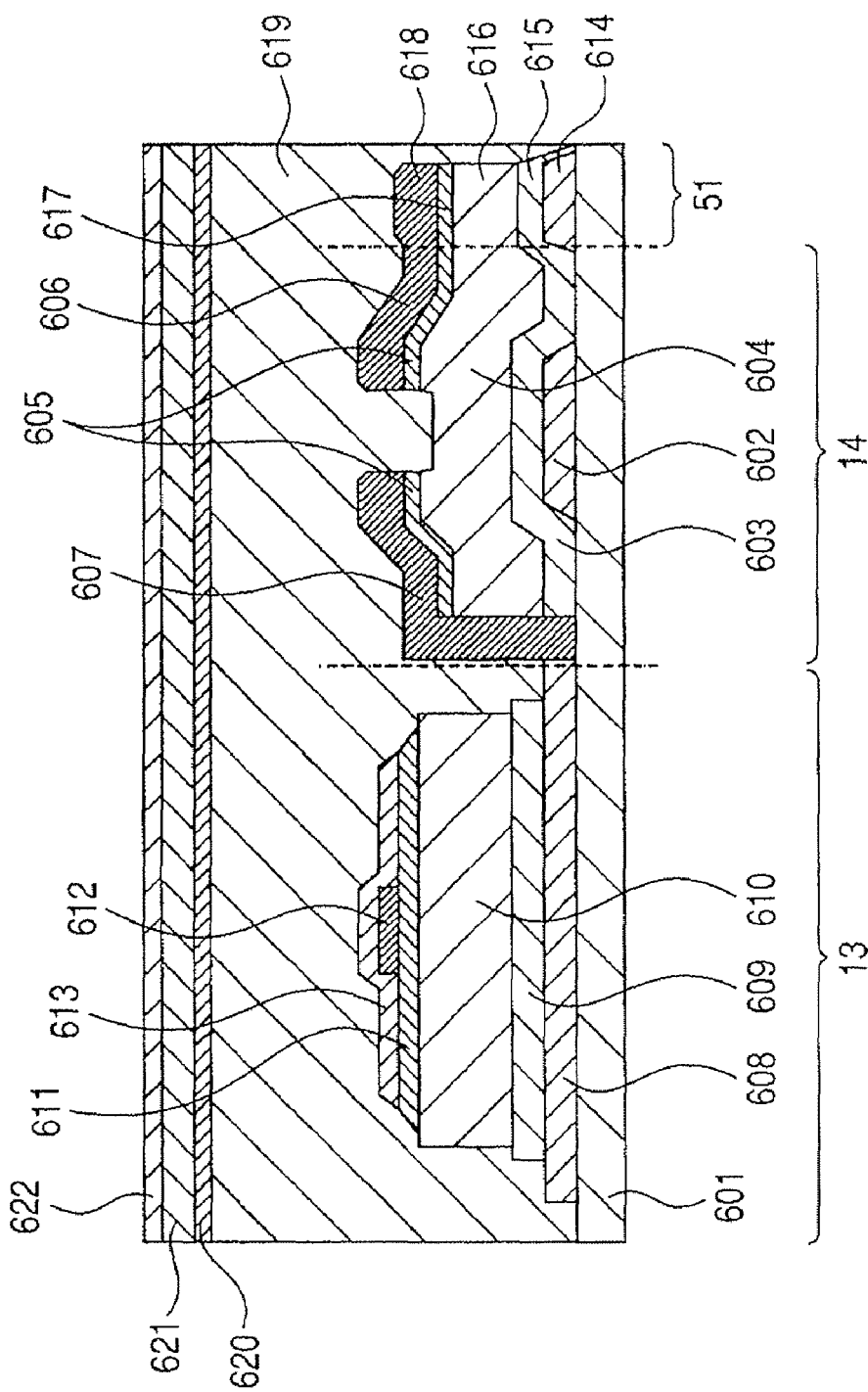
FIG. 6 is a schematic sectional view for one pixel of the two-dimensional area sensor of an X-ray image pickup apparatus of the second embodiment of the present invention.

FIG. 5 is a circuit diagram for one pixel of an area sensor of the X-ray image pickup apparatus of the second embodiment of the present invention. Moreover, FIG. 6 is a schematic sectional view of one pixel of the area sensor of the X-ray image pickup apparatus of the second embodiment of the present invention.

As shown in FIG. 5, the pixel of this embodiment is constituted by including the MIS-type photoelectric conversion element 13 and TFT 14 serving as a switch element. A voltage is supplied to the MIS-type photoelectric conversion element 13 from a sensor power supply 54 through a sensor bias wiring 53. Moreover, a voltage corresponding to the number of pixels for simultaneously reading electrical signals from the reading circuit 104 is supplied to the TFT 14 from the TFT-on power supply 27 through the vertical driving circuit 105 and drive wiring 52. Furthermore, an electrical signal transferred from the TFT 14 is input to the amplifier 20 through a signal wiring 51.

Because this embodiment uses an MIS-type photoelectric conversion element as a photoelectric element of the two-dimensional area sensor (sensor array) 103, the refresh operation to be described later is necessary. Therefore, the sensor power supply 54 and the reference power supply 55 of the amplifier 20 are constituted so that two types of voltages can be changed. This voltage change is performed by control signals VSC and VRC output from the control unit 108.

The sensor power supply 54 supplies a voltage f in the photoelectric conversion mode of the MIS-type photoelectric conversion element 13 and supplies a voltage g (voltage g<voltage f) in the refresh mode of the MIS-type photoelectric conversion element 13. Moreover, the reference power supply 55 supplies a voltage e in the photoelectric conversion mode of the MIS-type photoelectric conversion element 13 and supplies a voltage d (voltage d>voltage e) in the refresh mode of the MIS-type photoelectric conversion element 13.

The second embodiment is constituted so that three different voltages Vcom(a), Vcom(b) and Vcom(c) can be supplied from the TFT-on power supply 27 similarly to the case of the first embodiment. However, magnitudes of voltages are in the relation of Vcom(a)>Vcom(b)<Vcom(c). The voltage Vcom (a) is supplied in the case of the still image radiographing mode for reading electrical signals every pixel from the reading circuit 104 and voltages Vcom(b) and Vcom(c) are supplied in the moving image radiographing mode for simultaneously adding and reading electrical signals by a plurality of pixels from the reading circuit 104.

Then, a sectional configuration of one pixel in the area sensor of the X-ray image pickup apparatus of this embodiment is described by referring to FIG. 6.

The TFT 14 is formed over a glass substrate 601 which is an insulating substrate and has a gate electrode layer 602 made of either of aluminum and chromium or an alloy of these metals and an insulating layer 603 formed over the gate electrode layer 602 and made of amorphous silicon nitride for cutting off entry of positive and negative electric charges. Moreover, the TFT 14 has a channel layer 604 formed over the insulating layer 603 and made of amorphous silicon hydride (a-Si:H) and a source electrode layer 606 and drain electrode layer 607 formed above the channel layer 604 by keeping a predetermine distance from each other and respectively made of either of aluminum and chromium or alloy of these metals. Furthermore, the TFT 14 is constituted by including $N^+$-type amorphous silicon layer 605 which is an impurity semiconductor layer formed between the channel layer 604 and source electrode layer 606 and between the channel layer 604 and drain electrode layer 607 to bring the channel layer 604 into ohmic contact with the source electrode layer 606 or drain electrode layer 607.

The MIS-type photoelectric conversion element 13 has a bottom electrode layer 608 formed over the glass substrate 601 which is an insulating substrate and made of either of aluminum and chromium or alloy of these metals and an insulating layer 609 formed over the bottom electrode layer 608 and made of amorphous silicon nitride for cutting off entry of positive and negative electric charges. Moreover, the element 13 has a photoelectric conversion layer 610 which is formed over the insulating layer 609 and which is a semiconductor layer of amorphous silicon hydride for generating electric charges corresponding to the quantity of incident X rays and an $N^+$-type amorphous silicon layer 611 formed over the photoelectric conversion layer 610 and serving as a blocking layer for cutting off entry of positive electric charges (positive holes) from a sensor bias electrode layer 612 to be described later to the photoelectric conversion layer 610. Furthermore, the element 13 has a sensor bias electrode layer 612 formed over a part of the $N^+$-type amorphous silicon layer 611 and made of either of aluminum and chromium or alloy of these metals. Furthermore, the element 13 is constituted by including a transparent electrode layer 613 constituted of a transparent ITO thin film formed so as to cover the upside of the $N^+$-type amorphous silicon layer 611 and the upside of the sensor bias electrode layer 612.

Furthermore, the signal wiring 51 is formed of a layer configuration same as that of the TFT 14. Specifically, the signal wiring 51 has a configuration constituted by including a bottom electrode layer 614, insulating layer 615, semiconductor layer 616, $N^+$-type amorphous silicon layer 617 and top electrode layer 618 which are formed over the glass substrate 601 and laminated.

Furthermore, a protective layer 619 for protecting the MIS-type photoelectric conversion element 13, TFT 14 and signal wiring 51 from humidity or foreign matter, phosphor 621 serving as a wavelength converting body for converting X ray into visible light, adhesive layer 620 for bonding the protective layer 619 and phosphor 621 and phosphor protective layer 622 for protecting the phosphor 621 from humidity are formed above the MIS-type photoelectric conversion element 13, TFT 14 and signal wiring 51. In this case, as a material of the phosphor 621, a material mainly containing at least any one of $Gd_2O_2S$, $Gd_2O_3$ and CsI is used.

The bottom electrode layer 608 of the MIS-type photoelectric conversion element 13 is electrically connected with the drain electrode layer 607 of the TFT 14. Moreover, it is allowed to form the bottom electrode layer 608 of the MIS-type photoelectric conversion element 13, the gate electrode layer 602 of the TFT 14 and the bottom electrode layer 614 of the signal wiring 51 in the same process. Moreover, it is allowed to form the insulating layer 609 of the MIS-type photoelectric conversion element 13, insulating layer 603 of the TFT 14 and insulating layer 615 of the signal wiring 51 in the same process. Furthermore, it is allowed to form the photoelectric conversion layer 610 of the MIS-type photoelectric conversion element 13, channel layer 604 of the TFT 14 and semiconductor layer 616 of the signal wiring 51 in the same process. Furthermore, it is allowed to form the $N^+$-type amorphous silicon layer 611 of the MIS-type photoelectric conversion element 13, $N^+$-type amorphous silicon layer 605 of the TFT 14 and $N^+$-type amorphous silicon layer 617 of the signal wiring 51 in the same process. It is allowed to form the sensor bias electrode layer 612 of the MIS-type photoelectric conversion element 13, source electrode layer 606 and drain electrode layer 607 of the TFT 14 and top electrode layer 618 of the signal wiring 51 in the same process.

Figure 7A:
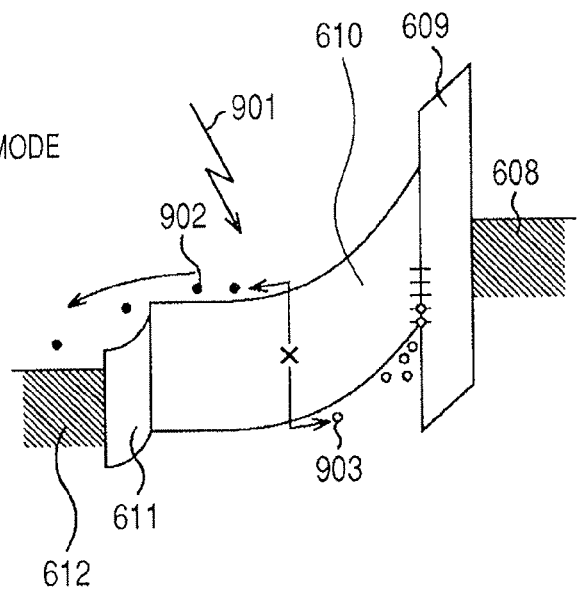
FIGS. 7A, 7B and 7C are energy band diagrams for explaining the operation principle of an MIS-type photoelectric conversion element.
Figure 7B:
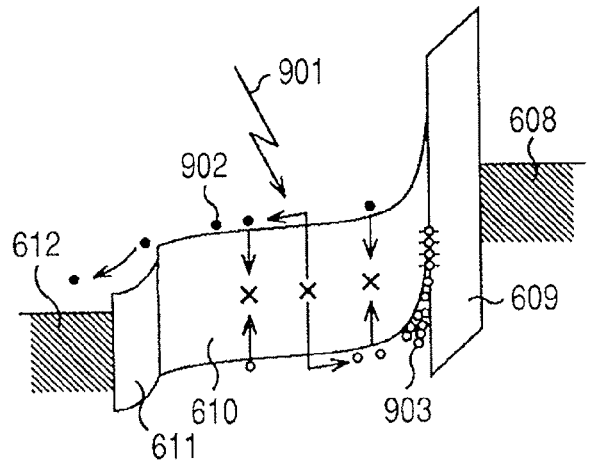
Figure 7C:
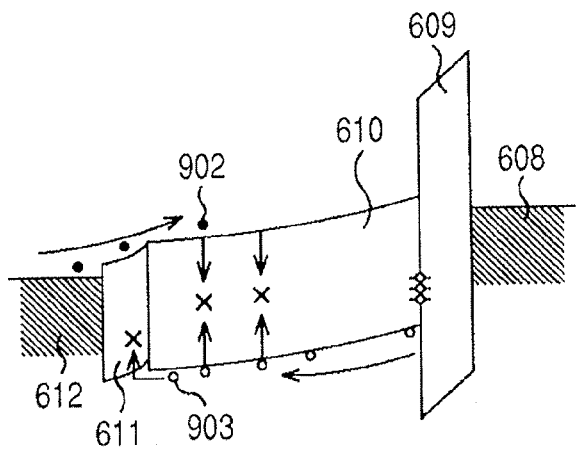

FIGS. 7A, 7B and 7C are energy band diagrams for explaining the operation principle of the MIS-type photoelectric conversion element 13.

FIG. 7A shows the time of the accumulating operation when applying a positive voltage to the sensor bias electrode layer 612 of the MIS-type photoelectric conversion element 13 (photoelectric conversion mode). In the photoelectric conversion mode, an electron 902 and positive hole 903 are generated from the light 901 incoming by the photoelectric effect in the photoelectric conversion layer 610.

The positive hole 903 is moved to the interface with the insulating layer 609 of the photoelectric conversion layer 610 by an electric field and the electron 902 is moved to the $N^+$-type amorphous silicon layer 611 side. In this case, the positive hole 903 cannot escape from the insulating layer 609 and move, it is accumulated on the interface with the insulating layer 609 of the photoelectric conversion layer 610 as described above. According to the accumulation of the positive holes 903, a voltage proportional to the dose or time of the light 901 is generated in the MIS-type photoelectric conversion element 13 and the potential of the bottom electrode layer 608 is lowered. By turning on the TFT 14, current flows through the bottom electrode layer 608 and it is possible to obtain an image signal by detecting the current.

However, as shown in FIG. 7B, when a certain quantity of positive holes 903 is accumulated, a voltage due to the positive holes 903 accumulated on the interface with the insulating layer 609 of the photoelectric conversion layer 610 becomes equal to a voltage to be applied to the MIS-type photoelectric conversion element 13 and an electric field does not occur in the photoelectric conversion layer 610. This state is referred to as a saturated state. In the saturated state, the positive holes 903 generated in the photoelectric conversion layer 610 cannot move to the interface with the insulating layer 609 of the photoelectric conversion layer 610 and are recombined with electrons 902 and disappear. Therefore, a voltage proportional to the dose or time of the light 901 does occur and under this state, a normal X-ray image cannot be obtained.

To return the state of the MIS-type photoelectric conversion element 13 to the state of the photoelectric conversion mode in FIG. 7A again, it is necessary to bring the voltage of the sensor bias electrode layer 612 into a voltage lower than the states in FIGS. 7A and 7B and remove the positive holes 903 accumulated on the interface with the insulating layer 609 of the photoelectric conversion layer 610. This state is referred to as a refresh mode and the energy band diagram in this case is shown in FIG. 7C.

The positive holes 903 removed in the refresh mode in FIG. 7C can be accumulated in the photoelectric conversion mode in FIG. 7A. That is, by setting a sensor bias provided in the refresh mode to a lower value, the MIS-type photoelectric conversion element 13 is not easily saturated even if much light 901 is irradiated.

However, immediately after the refresh mode in FIG. 7C is changed to the photoelectric conversion mode in FIG. 7A, a current due to the electrons 902 injected in the refresh mode flows and dark current is temporarily increased. Moreover, the amount of the electrons 902 injected to the photoelectric conversion layer 610 is increased as the sensor bias at the time of refresh is lowered. Therefore, the sensor biases in the refresh mode in FIG. 7C and the photoelectric conversion mode in FIG. 7A are optimized and set so as to become the dynamic range and dark current in which the MIS-type photoelectric conversion element 13 is requested as an X-ray image pickup apparatus.

Figure 8:
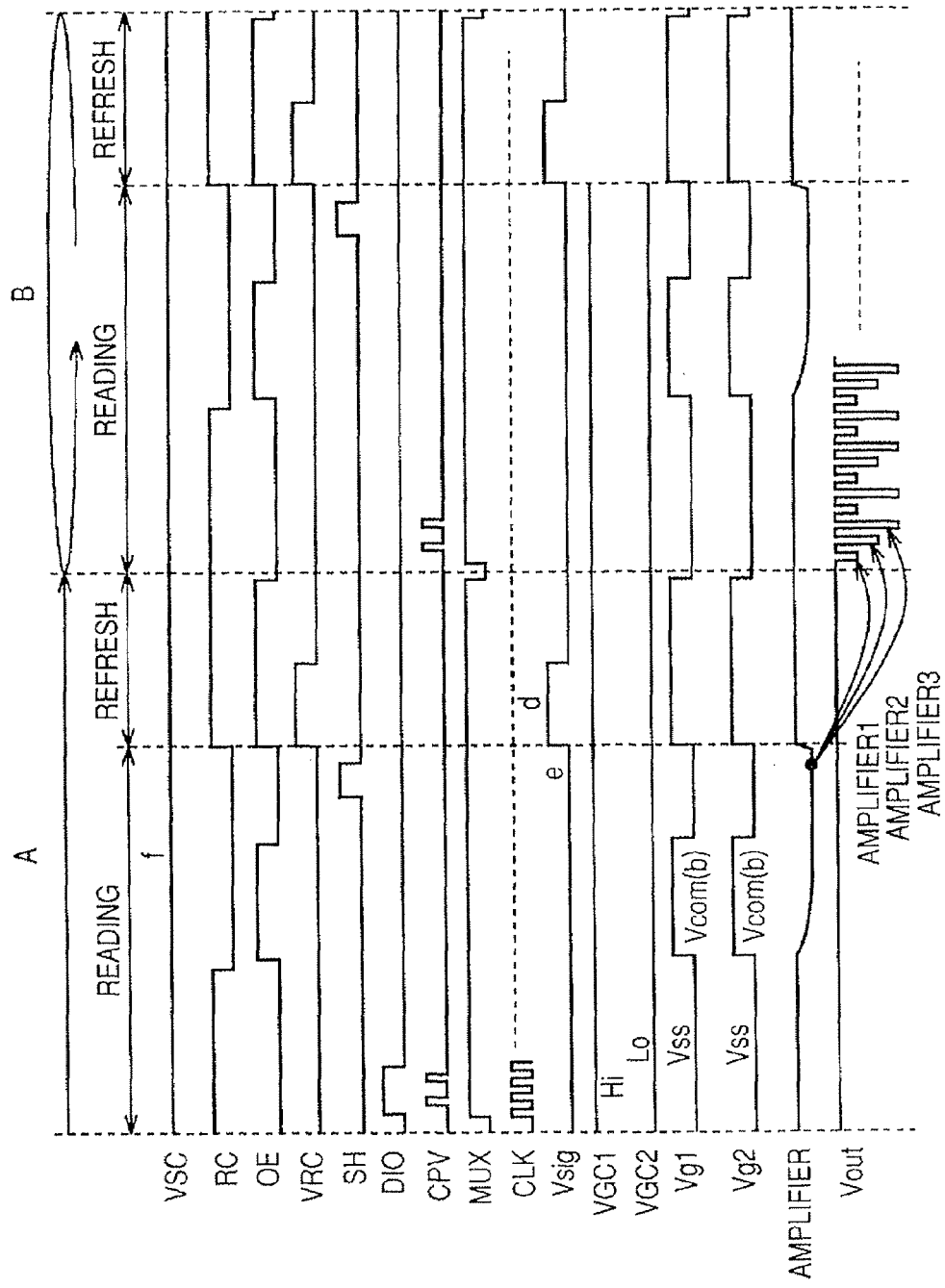
FIG. 8 is a timing chart showing driving in the moving image radiographing mode for adding and reading an pixel output of the two-dimensional area sensor of the X-ray image pickup apparatus of the second embodiment of the present invention by two pixels per signal line.

FIG. 8 is a timing chart showing driving of the X-ray image pickup apparatus of the second embodiment of the present invention in the moving image radiographing mode for reading pixel outputs of the area sensor by adding two pixels for one signal wiring 51.

To perform moving image radiographing by a two-dimensional sensor using the MIS-type photoelectric conversion element 13, it is necessary to alternately perform read of pixels connected to the drive wiring 52 (a plurality of drive wirings at the time of pixel addition) and refresh of the read pixels.

First, the control signal RC is set to Hi and an output of the amplifier 20 is reset. According to this operation, the output of the amplifier 20 and voltage of the signal wiring 51 become the voltage e of the reference power supply 55 of the amplifier 20. By resetting the output of the signal wiring 51 or amplifier 20 before reading a pixel output, it is possible to remove unnecessary offset or noise generated at the time of the last read and image quality can be improved.

Then, as shown in FIG. 8, the control signals DIO and CPV are input to the vertical driving circuit 105 to prepare that TFTs 14 in two drive wirings (Vg1 and Vg2 in FIG. 8) are simultaneously turned on. Then, after the amplifier 20 is reset for sufficient time, the control signal OE is set to Hi and a desired voltage is supplied from the TFT-on power supply 27. In this case, the control signal VGC1 set to Hi and the control signal VGC2 set to Lo are transmitted to the TFT-on power supply 27 from the control unit 108. Thereby, the voltage Vcom(b) is supplied to two drive wirings (Vg1 and Vg2 in FIG. 8) from the TFT-on power supply 27 and the TFTs 14 are simultaneously turned on in two lines. In this case, electric charges of two pixels per signal wiring 51 are simultaneously transferred to the amplifier 20 and added.

The TFTs 14 are turned on for a period sufficient to transfer electric charges accumulated in the MIS-type photoelectric conversion element 13 and then, the control signal OE is set to Lo to turn off the TFTs 14. Then, after turning off the TFTs 14, the control signal SH is set to Hi to hold an output of each amplifier 20 by the sample hold circuit 203. According to the above read operation, it is possible to add and read electric charges for two pixels for one signal wiring 51.

After the read operation is completed, the refresh operation of the MIS-type photoelectric conversion element 13 is then performed.

The refresh operation of this embodiment is performed by raising the potential of the bottom electrode layer 608 of the MIS-type photoelectric conversion element 13 by the amplifier 20 (lowering the potential). Therefore, the control signal RC is set to Hi to reset the amplifier 20. In this case, control is performed so that the voltage d is output from the amplifier 20 by setting the control signal VRC to Hi.

By setting the control signal OE to Hi under this state and turning on the TFTs 14, the potential of the bottom electrode layer 608 becomes higher than the time of read and the MIS-type photoelectric conversion element 13 becomes a refresh state.

After sufficiently performing the refresh operation of the MIS-type photoelectric conversion element 13, by setting the control signal VRC to Lo and the potential of the bottom electrode layer 608 to the voltage e, the refresh operation is completed and the MIS-type photoelectric conversion element 13 is set to the photoelectric conversion mode. After the potential of the bottom electrode layer 608 is set to the voltage e, the control signal OE is set to Lo to turn off the TFTs 14. Then, to read all pixels of a two-dimensional area sensor by adding two pixels, it is only necessary to repeat the driving pattern of the interval B shown in FIG. 8.

Figure 9:
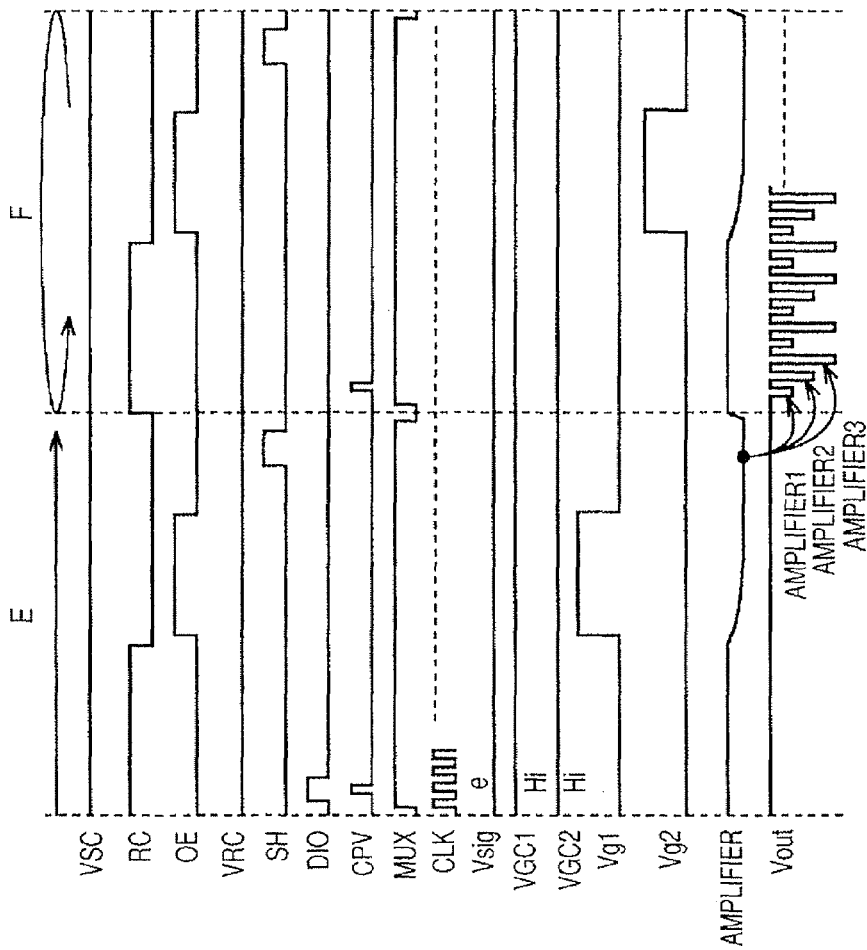
FIGS. 9A and 9B are timing charts showing driving in the still image radiographing mode for reading a pixel output of the two-dimensional area sensor of the X-ray image pickup apparatus of the second embodiment of the present invention every one pixel per signal line.

FIGS. 9A and 9B are timing charts respectively showing driving of the X-ray image pickup apparatus of the second embodiment of the present invention in the still image radiographing mode for reading pixel outputs of the area sensor every pixel for one signal wiring 51. FIG. 9A shows a timing chart of the refresh operation and FIG. 9B shows a timing chart of the read operation.

The refresh operation of this embodiment which is still image radiographing is performed by changing a voltage to be applied to the sensor bias wiring 53 differently from the operation in the moving image radiographing mode. First, the control signal VSC is set to Lo to change a voltage to be applied to a sensor bias wiring from f to g. Moreover, the control signal VRC is set to Lo to perform control so that the voltage e is output from the amplifier 20. In this case, the potential of the signal wiring 51 simultaneously becomes the voltage e.

By setting the control signal OE to Hi under this state and turning on the TFTs 14, the bottom electrode layer 608 is fixed to the voltage e. Thereby, a voltage of g-e is applied to the both ends the MIS-type photoelectric conversion element. In this case, where voltage f>g>e, the potential of the $N^+$-type amorphous silicon layer side of the MIS-type photoelectric conversion element 13 rises to become the refresh state. To refresh all pixels of the two-dimensional area sensor, the driving pattern in the interval B is repeatedly performed.

After setting all pixels to the refresh state, the control signal VSC is set to Hi and the voltage f is applied to the sensor bias wiring. Under this state, the control signal OE is set to Hi to fix the bottom electrode layer 608 to the voltage e again. According to this operation, the potential at the $N^+$-type amorphous silicon layer side lowers from the insulating layer 609 side of the photoelectric conversion layer and the MIS-type photoelectric conversion element becomes the accumulation mode. To set all pixels of the two-dimensional area sensor to the photoelectric conversion mode, the driving pattern in the interval D is repeatedly performed.

After sufficiently performing the refresh operation of the MIS-type photoelectric conversion element 13, by setting the control signal VRC to Lo and the potential of the bottom electrode layer 608 to the voltage e, the refresh operation in FIG. 9A is completed to become the photoelectric conversion mode in FIG. 9B.

In the photoelectric conversion mode in FIG. 9B, the control signal RC is first set to Hi to reset an output of the amplifier 20. According to this operation, the output of the amplifier 20 and voltage of the signal wiring 51 become the voltage e of the reference power supply 55 of the amplifier 20. By resetting the signal wiring 51 or output of the amplifier 20 before reading a pixel output, it is possible to remove unnecessary offset or noise generated at the time of the last read and the quality of an image is improved.

Then, control signals DIO and CPV are input to the vertical driving circuit 105 as shown in FIG. 9B to prepare that TFTs 14 at the drive wirings (Vg1 and Vg2 in FIG. 9B) 52 are turned on every drive wiring. Then, after resetting the amplifier 20 for a sufficient time, the control signal OE is set to Hi to supply a desired voltage from the TFT-on power supply 27. In this case, Hi control signals VGC1 and VGC2 are transmitted to the TFT-on power supply 27 from the control unit 108 and the voltage Vcom(a) is supplied to each drive wiring from the TFT-on power supply 27. Then, to read all pixels of a two-dimensional sensor, it is only necessary to repeat the driving pattern in the interval B shown in 9B.

Third Embodiment

Third embodiment is an embodiment to which a PIN-type photoelectric conversion element is applied as the photoelectric conversion element of the two-dimensional area sensor 103. The PIN-type photoelectric conversion element is different from the MIS-type photoelectric conversion element 13 shown for the second embodiment and it does not require the refresh operation. Therefore, a circuit diagram for one pixel of a two-dimensional area sensor (sensor array) when using a PIN-type photoelectric conversion element is the same as that shown in FIG. 3. In this case, the sensor power supply 206 is designed so as to output a voltage necessary when a PIN-type photoelectric conversion element performs photoelectric conversion.

Figure 10:
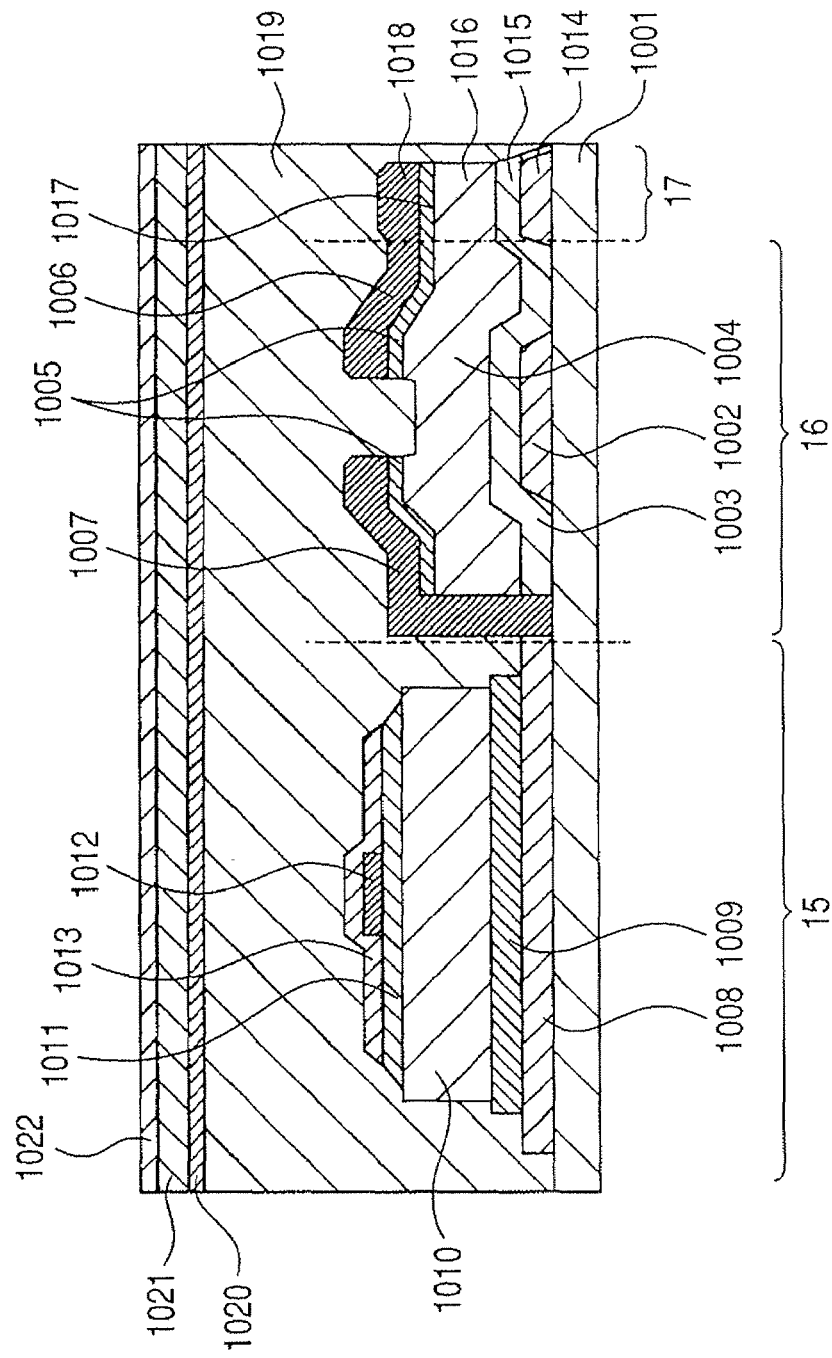
FIG. 10 is a schematic sectional view of one pixel of a two-dimensional area sensor of an X-ray image pickup apparatus of third embodiment of the present invention.

FIG. 10 is a schematic sectional view of one pixel of the area sensor of the X-ray image pickup apparatus of the third embodiment of the present invention.

A TFT 16 is formed over a glass substrate 1001 serving as an insulating substrate on which a gate electrode layer 1002, insulating layer 1003, channel layer 1004, $N^+$-type amorphous silicon layer 1005 and source electrode layer 1006 or drain electrode layer 1007 are successively laminated. The gate electrode layer 1002 is formed above the glass substrate 1001 and made of either of aluminum and chromium or alloy of these metals. The insulating layer 1003 is formed over the gate electrode layer 1002 and made of amorphous silicon nitride for cutting off entry of positive and negative electric charges. The channel layer 1004 is formed over the insulating layer 1003 and made of amorphous silicon hydride (a-Si:H). The source electrode layer 1006 and drain electrode layer 1007 are formed above the channel layer 1004 by keeping a predetermined distance from each other and made of either of aluminum and chromium or alloy of these metals. The $N^+$-type amorphous silicon layer 1005 serving as an impurity semiconductor layer is formed between the channel layer 1004 and the source electrode layer 1006 and between the channel layer 1004 and the drain electrode layer 1007 to bring the channel layer 1004 into ohmic contact with the source electrode layer 1006 or drain electrode layer 1007.

A PIN-type photoelectric conversion element 15 is formed above the glass substrate 1001 serving as an insulating substrate on which a bottom electrode layer 1008, $N^+$-amorphous silicon layer 1009, photoelectric conversion layer 1010, $P^+$-type amorphous silicon layer 1011, sensor bias electrode layer 1012 and transparent electrode layer 1013 are successively laminated. The bottom electrode layer 1008 is made of either of aluminum and chromium or alloy of these metals. The photoelectric conversion layer 1010 is formed above the bottom electrode layer 1008 and constituted of a semiconductor layer of amorphous silicon hydride for generating electric charges corresponding to the quantity of X-ray. The $N^+$-type amorphous silicon layer 1009 is formed between the bottom electrode layer 1008 and the photoelectric conversion layer 1010 to serve as a first blocking layer for cutting off entry of positive electric charges to the photoelectric conversion layer 1010. The $P^+$-type amorphous silicon layer 1011 is formed over the photoelectric conversion layer 1010 to serve as a second blocking layer for cutting off entry of negative electric charges to the photoelectric conversion layer 1010. The sensor bias electrode layer 1012 is formed over a part of the $P^+$-type amorphous silicon layer 1011 and made of either of aluminum and chromium or alloy of these metals. The transparent electrode layer 1013 is formed so as to cover the upside of the $P^+$-type amorphous silicon layer 1011 and the upside of the sensor bias electrode layer 1012 and formed of a transparent ITO thin film.

Moreover, the signal wiring 17 is formed of the layer configuration same as the case of the TFT 16, in which a bottom electrode layer 1014, insulating layer 1015, semiconductor layer 1016, $N^+$-type amorphous silicon layer 1017 and top electrode layer 1018 are successively laminated on the glass substrate 1001 serving as an insulating substrate.

Furthermore, a protective layer 1019 for protecting the PIN-type photoelectric conversion element 15, TFT 16 and signal wiring 17 from humidity or foreign matter, phosphor 1021 serving as a wavelength converting body for converting X ray into visible light and phosphor protective layer 1022 for protecting the phosphor 1021 from humidity are formed above the PIN-type photoelectric conversion element 15, TFT 16 and signal wiring 17. In this case, as a material of the phosphor 1021, a substance mainly containing at least any one of $Gd_2O_2S$, $Gd_2O_3$ and CsI is used. Moreover, it is allowed to form an adhesive layer 1020 for bonding the protective layer 1019 with the phosphor 1021.

The bottom electrode layer 1008 of the PIN-type photoelectric conversion element 15 is electrically connected with the drain electrode layer 1007 of the TFT 16.

Fourth Embodiment

Fourth embodiment is an embodiment to which a direct-conversion-type conversion element for directly converting an incoming X ray into an electrical signal is applied without using the phosphor 621 shown in FIG. 6 (or phosphor 1021 shown in FIG. 10) as the photoelectric conversion element of the two-dimensional area sensor. The direct-conversion-type conversion element used for this embodiment is made of a material mainly containing at least any one of amorphous selenium (a-Se), $PbI_2$, $HgI_2$ and CdTe.

Fifth Embodiment

Figure 11:
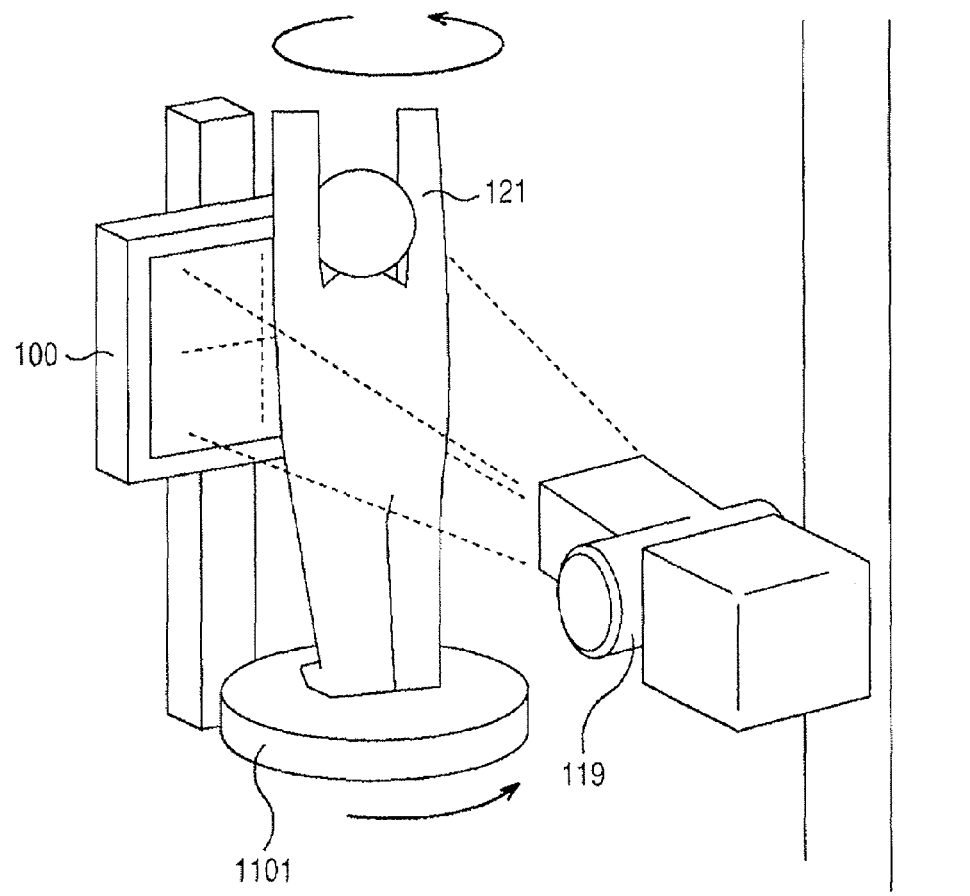
FIG. 11 is a schematic view of an X-ray image pickup system of fifth embodiment of the present invention.
Figure 12:
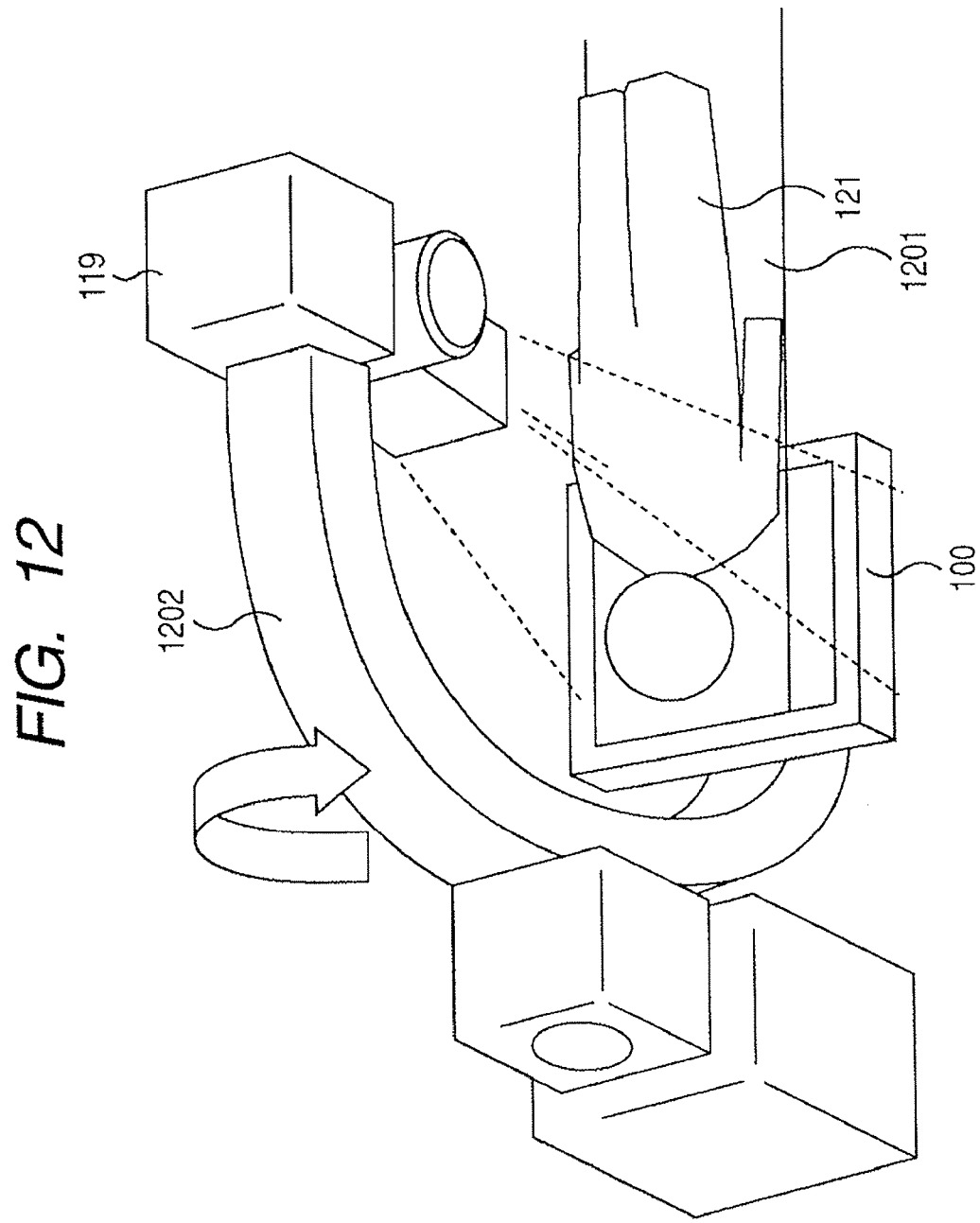
FIG. 12 is a schematic view of the X-ray image pickup system of the fifth embodiment of the present invention.

Fifth embodiment is an embodiment which is applied to an X-ray image pickup system for performing CT radiographing using the X-ray image pickup apparatus 100. CT radiographing X-ray-radiographs an object from a plurality of directions and calculates and images an optional tomographic image of the object from these radiographing images by a computer. This embodiment is described by using CBCT (Corn-Beam CT) radiographing for emitting a conical X ray (cone beam) from an X-ray generating apparatus serving as CT radiographing means as an example. FIGS. 11 and 12 are schematic views of the X-ray image pickup system of the fifth embodiment of the present invention.

The X-ray image pickup system shown in FIG. 11 is constituted by including an X-ray generating apparatus 119 for emitting a conical X ray (cone beam) to the object (patient) 121, X-ray image pickup apparatus set to a position opposite the X-ray generating apparatus 119 to image-pick up the X-ray passing through the object 121 and a rotating table 1101 for mounting the object 121.

In the case of the X-ray image pickup system in FIG. 11, with the X-ray generating apparatus 119 faced to the X-ray image pickup apparatus 100 at a predetermined position, a cone beam is emitted from the X-ray generating apparatus 119 while rotating the rotating table 1101 mounting the object 121 in the direction shown by an arrow in FIG. 11 to radiograph an optional tomographic image of the object 121.

In the case of the X-ray image pickup system in FIG. 11, CT radiographing of a chest region is theoretically possible by half-rotating the object (patient) 121. Therefore, radiographing can be made in a short time compared to a conventional X-ray image pickup apparatus for performing CT radiographing. Moreover, because CT radiographing is performed by rotating the object 121, it is not necessary to use a complex movable unit and it is possible to downsize the whole system because the system configuration can be simplified.

Furthermore, because the X-ray image pickup system in FIG. 11 is able to perform simple radiographing in addition to CT radiographing, it is possible to set the system even at a place where there is no setting space such as a clinic or small-scale hospital. However, because it is necessary to radiograph the object (patient) 121 while it is erect, when an patient has no consciousness or cannot be erect, CT radiographing is cannot be easily performed. As described above, it is preferable to use the X-ray image pickup system in FIG. 11 for CT radiographing when performing medical examination in a clinic or small-scale hospital.

The X-ray image pickup system shown in FIG. 12 is constituted by including the X-ray generating apparatus 119 for emitting a conical X ray (cone beam) to the object (patient) 121, X-ray image pickup apparatus 100 set to a position opposite to the X-ray generating apparatus 119 to radiograph the X ray passing through the object 121, bed 1201 for mounting the object 121 and movable unit 1202 for integrally moving the X-ray image pickup apparatus 100 and X-ray generating apparatus 119 while they are opposite to each other.

In the case of the X-ray image pickup system in FIG. 12, a cone beam is emitted from the X-ray generating apparatus 119 while rotating the movable unit 1202 in the direction shown by the arrow in FIG. 12 centering around the bed 1201 mounting the object 121 to radiograph an optional tomographic image of the object 121.

When consciousness of a patient is absent, the patient cannot be erect, or a contrast agent is used, the X-ray image pickup system in FIG. 12 is effective. However, because the heavy X-ray generating apparatus 119 or X-ray image pickup apparatus 100 is operated, an apparatus configuration becomes a large scale or a space considering safety is necessary. Therefore, the apparatus can be used only at a loose-fitting setting space.

In the case of the X-ray image pickup apparatus 100 shown in FIGS. 11 and 12, because the two-dimensional area sensor 103 is formed over a glass substrate by using an amorphous silicon process, it is possible to easily form an apparatus of approx. 50×60 cm. When performing CT radiographing by using an X-ray image pickup apparatus having the two-dimensional sensor 103, the X-ray irradiation range is not narrow like a conventional CT radiographing apparatus, X ray is irradiated in a wide range and it is possible to radiograph the whole radiographing portion. Therefore, it is possible to decrease the time required for CT radiographing.

CT radiographing using a digital X-ray image pickup apparatus can be made by various embodiments of the present invention. However, to realize a digital X-ray image pickup apparatus capable of performing both simple radiographing and CT radiographing, it is necessary to add pixel outputs and increase an apparent pixel size so that a necessary fault thickness can be obtained. This is because a fault thickness radiographed by a generally-spread CT image pickup apparatus ranges between 0.5 and 10 mm. Therefore, to realize a fault thickness of 0.5 mm by a two-dimensional area sensor of a 200-μm pitch, 250 is necessary as the added number of pixels. Moreover, in the case of the CT radiographing requiring a large added number of pixels, the X-ray image pickup apparatus and X-ray image pickup system shown for each embodiment of the present invention are preferable.

The present invention relates to pixel addition indispensable to change of a digital X-ray image pickup apparatus to high sensitivity and high-speed read. By using the present invention, it is possible to avoid decrease of a dynamic range or deterioration of sensitivity characteristic of an X-ray image pickup apparatus generated at the time of pixel addition. Therefore, by using the present invention, it is possible to realize change of a digital X-ray image pickup apparatus to high sensitivity and high-speed read while avoiding decrease of a dynamic range or deterioration of sensitivity characteristic of an X-ray image pickup apparatus generated at the time of pixel addition and various radiographings such as fluoroscopy and CT radiographing by a digital X-ray image pickup apparatus can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-253559, filed Sep. 1, 2005 which is hereby incorporated by reference herein in its entirety.

What is claimed is:

1. A radiation image pickup apparatus comprising:
    a sensor array in which a plurality of pixels are two-dimensionally arranged, in which each of the pixels are provided with a conversion element for converting radiation into electric charge and switch element for transferring an electrical signal according to the electric charge to the outside;
    a reading circuit for reading the electrical signal transferred from the switch element through a signal wiring;
    a driving circuit for supplying a drive signal to the switch element through a drive wiring in order to transfer the electrical signal to the reading circuit; and
    a control unit for lowering the voltage value of the drive signal as a number of the drive wirings to which the drive signal is supplied from the driving circuit increases.

2. The radiation image pickup apparatus according to claim 1, wherein
    the conversion element includes a wavelength converting body for converting the radiation into visible light and the wavelength converting body is made of a material mainly containing at least any one of $Gd_2O_2S$, $GD_2O_3$ and CsI.

3. The radiation image pickup apparatus according to claim 2, wherein
    the conversion element includes a conversion element of an MIS-type structure having a first electrode layer set on an insulating substrate, insulating layer set on the first electrode layer to cut off entry of positive and negative electric charges, semiconductor layer set on the insulating layer to generate electric charges corresponding to the quantity of radiation, impurity semiconductor layer set on the semiconductor layer to cut off entry of positive electric charges to the semiconductor layer and second electrode layer set on a part of the impurity semiconductor layer.

4. The radiation image pickup apparatus according to claim 2, wherein
    the conversion element includes a conversion element of a PIN-type structure having a first electrode layer set on an insulating substrate, semiconductor layer set above the first electrode layer to generate electric charge corresponding to the quantity of radiation, first-conductivity-type impurity semiconductor layer formed between the first electrode layer and the semiconductor layer to cut off entry of positive electric charge to the semiconductor layer, second-conductivity-type impurity semiconductor layer having a state reverse to the positive or negative state of the first-conductivity-type impurity semiconductor layer and set on the semiconductor layer to cut off entry of negative electric charge to the semiconductor layer and second electrode layer set to a part of the second-conductivity-type impurity semiconductor layer.

5. The radiation image pickup apparatus according to claim 1, wherein
    the switch element is a thin-film transistor (TFT) having a first electrode layer set above an insulating substrate, insulating layer set on the first electrode layer to cut off entry of positive and negative electric charges, channel layer set on the insulating layer, second and third electrode layers set above the channel layer by keeping a predetermined distance and impurity semiconductor layer set between the channel layer and the second electrode layer and between the channel layer and the third electrode layer to ohmic-contact the channel layer and the second electrode layer or the third electrode layer.

6. The radiation image pickup apparatus according to claim 1, further comprising image processing means for image-processing an electric signal read by the reading circuit.

7. A radiation image pickup system comprising:
a radiation image pickup apparatus of claim 1; and
the radiation generating apparatus for emitting the radiation, wherein the conversion element converts the radiation emitted from the radiation generating apparatus and passing through an object into an electrical signal.

8. A control method of a radiation image pickup apparatus having a sensor array provided with a conversion element which converts radiation into electric charge and a switch element for transferring an electrical signal according to the electric charge to the outside and in which a plurality of pixels are two-dimensionally arranged, a reading circuit for reading the electrical signal and a driving circuit for supplying a drive signal to the switch element and driving the switch element, wherein the voltage value of the drive signal is changed in accordance with the number of pixels when the electrical signal is simultaneously read by the reading circuit.

* * * * *